US008517592B2

(12) United States Patent
Shimizu

(10) Patent No.: US 8,517,592 B2
(45) Date of Patent: Aug. 27, 2013

(54) LIGHTING DEVICE, DISPLAY DEVICE AND TELEVISION RECEIVER

(75) Inventor: Takaharu Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 331 days.

(21) Appl. No.: 13/121,424

(22) PCT Filed: Jul. 13, 2009

(86) PCT No.: PCT/JP2009/062658
§ 371 (c)(1),
(2), (4) Date: Mar. 29, 2011

(87) PCT Pub. No.: WO2010/044296
PCT Pub. Date: Apr. 22, 2010

(65) Prior Publication Data
US 2011/0176065 A1    Jul. 21, 2011

(30) Foreign Application Priority Data
Oct. 16, 2008  (JP) .................................. 2008-267668

(51) Int. Cl.
*F21V 7/04* (2006.01)

(52) U.S. Cl.
USPC ........... 362/621; 362/632; 362/615; 362/628; 362/616

(58) Field of Classification Search
USPC ................. 362/632, 634, 612, 615, 621, 628, 362/97.1–97.3, 607, 622, 616, 23.09, 23.16
See application file for complete search history.

(56) References Cited

U.S. PATENT DOCUMENTS

| 7,690,831 | B2 * | 4/2010 | Mori et al. ..................... 362/621 |
| 7,775,701 | B2 * | 8/2010 | Lee et al. ........................ 362/633 |
| 7,961,271 | B2 * | 6/2011 | Tomita et al. ................... 349/65 |
| 8,421,955 | B2 * | 4/2013 | Kubota et al. ................ 362/97.2 |
| 2006/0007704 | A1 | 1/2006 | Mori et al. |
| 2008/0231774 | A1 | 9/2008 | Tomita et al. |

FOREIGN PATENT DOCUMENTS

| JP | 9-306222 A | 11/1997 |
| JP | 11-231321 A | 8/1999 |
| JP | 2004-6081 A | 1/2004 |
| JP | 2006-24439 A | 1/2006 |
| JP | 2008-243808 A | 10/2008 |

OTHER PUBLICATIONS

Official Communication issued in International Patent Application No. PCT/JP2009/062658, mailed on Oct. 20, 2009.

* cited by examiner

*Primary Examiner* — Bao Q Truong
(74) *Attorney, Agent, or Firm* — Keating & Bennett, LLP

(57) ABSTRACT

A lighting device includes an LED 16 and a light guide plate 18 that are fixed to a surface 51 of an LED board 17. The light guide plate 18 includes a light entrance surface 34 that is provided in an LED holding space 33 holding the LED 16 therein, a scattering surface 37 that is formed by performing perforation processing, and a light exit surface 36 through which light exits to outside of the light guide plate 18 after traveling through the light guide plate 18 and reflecting off the scattering surface 37. The LED holding space 33 is formed such that the light guide plate 18 has an opening for the LED holding space 33 and an opening size of the opening increases in a direction P1 in which a lower mold 47B integrally including a projection 47C for forming the LED holding space 33 is removed.

17 Claims, 17 Drawing Sheets

LIGHTING DEVICE, DISPLAY DEVICE AND TELEVISION RECEIVER

TECHNICAL FIELD

The present invention relates to a lighting device, a display device and a television receiver.

BACKGROUND ART

A lighting device disclosed in Patent Document 1 is known as a lighting device used in a display device of a television receiver. The lighting device includes light emitting components and light guide members. Rays of light are emitted from the light emitting components in a direction substantially parallel to a display surface of a liquid crystal panel. The light guide members receive rays of light emitted from the light emitting components and output the rays of light from light exit surfaces to the liquid crystal panel side. A scattering surface is formed on surfaces of the light guide members opposite from the liquid crystal panel by printing a scattering pattern that scatters rays of light.

Depending on the kind of the light guide members, instead of printing the scattering pattern, the surfaces of the light guide members may be processed to form asperities thereon to form the scattering surfaces. The light guide members are required to be formed by injection molding so as to be processed to form asperities thereon. In such a case, the light entrance surfaces of the light guide members are formed by injection molding.

Depending on the arrangement of the light guide members, the light emitting components may not be able to be provided outside the light guide members. In such a case, holding holes are provided in the light guide members and the light emitting components are arranged in the holding holes. In case of providing such holding holes, the light entrance surface is provided in the holding hole. The light entrance surface is normally provided along a direction in which the mold is removed with considering a mold structure of a molding die.
Patent Document 1: Japanese Published Patent Application No. 2006-24439

Problem to be Solved by the Invention

However, in removing the molding die for forming the holding holes, a surrounding portion of the holding hole may be cooled down and shrunk and the holding hole may be reduced in size. In such a case, the surrounding portion of the holding hole is adhered to the molding die. Therefore, when the molding die is removed from the body including the surrounding portion of the holding hole, the light entrance surface rubs against the molding die and may be damaged. If the light entrance surface is damaged, refracting direction of rays of light is changed due to the damage and the rays of light may exit outside of the light guide member. If the rays of light exit outside of the light guide member, the amount of light striking the light exit surface is reduced and this lowers brightness of the liquid crystal panel.

DISCLOSURE OF THE PRESENT INVENTION

The present invention was made in view of the foregoing circumstances. An object of the present invention is to achieve improved brightness.

Means for Solving the Problem

A lighting device of the present invention includes a light emitting component, a light guide member, and a base member on which the light emitting component and the light guide member are provided. The light guide member includes a holding portion, a light entrance surface, a scattering surface and a light exit surface. The holding portion has a holding space in the light guide member such that an opening size of the holding portion increases in a direction in which a molding die for forming the holding space is removed when forming the holding space and is configured to hold the light emitting component in the holding space. The light entrance surface is provided in the holding space. The scattering surface is formed by performing perforation processing. Light exits to outside of the light guide member through the light exit surface after traveling through the light guide member and reflecting off the scattering surface.

With this configuration, light entering the light entrance surface and traveling through the light guide member is reflected at the scattering surface. The reflected light exits to outside of the light guide member through the light exit surface. Because the holding space is formed in the light guide member such that an opening size of the holding portion increases in a direction in which a molding die for forming the holding space is removed. Therefore, the light entrance surface is less likely to be damaged when separating the molding die. The scattering surface with perforation processing is formed by injection molding. However, the light entrance surface is less likely to be damaged due to the injection molding. The infraction direction of light is less likely to be changed at the light entrance surface and improved brightness is achieved.

BEST MODE FOR CARRYING OUT THE INVENTION

First Embodiment

The first embodiment of the present invention will be explained with reference to FIGS. 1 to 16. In this embodiment, a liquid crystal display device 10 will be explained. X-axes, Y-axes and Z-axes in some figures correspond to each other so as to indicate the respective directions. In FIGS. 4 to 10, the upper side and the lower side correspond to the front-surface side and the rear-surface side, respectively.

<Configuration of Television Receiver>

Figure 1:
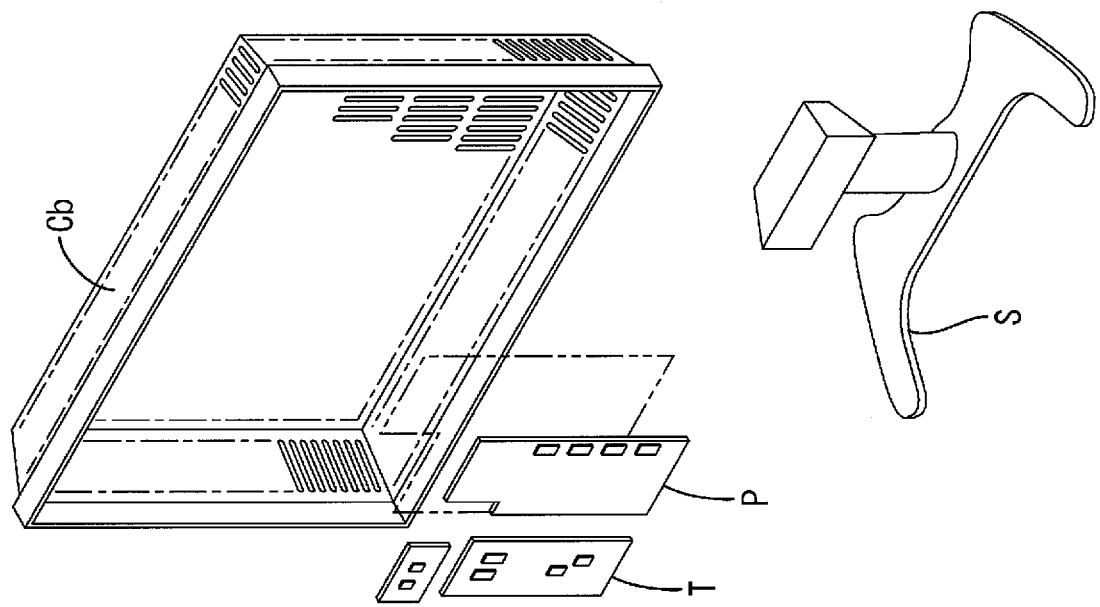
FIG. 1 is an exploded perspective view illustrating a general construction of a television receiver according to the first embodiment of the present invention.
Figure 1:
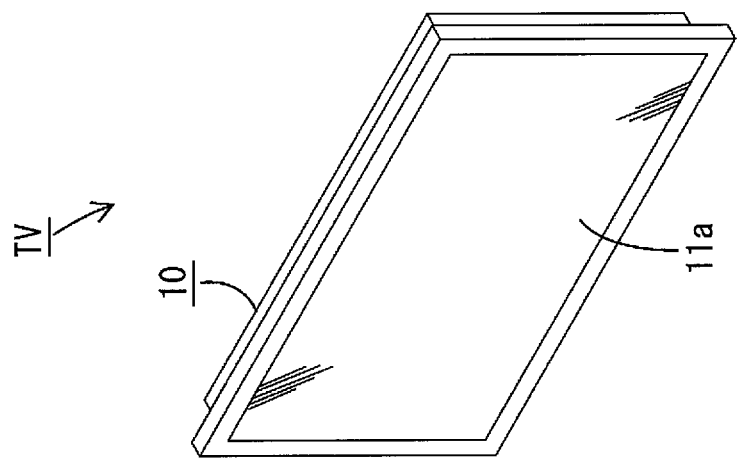
Figure 1:
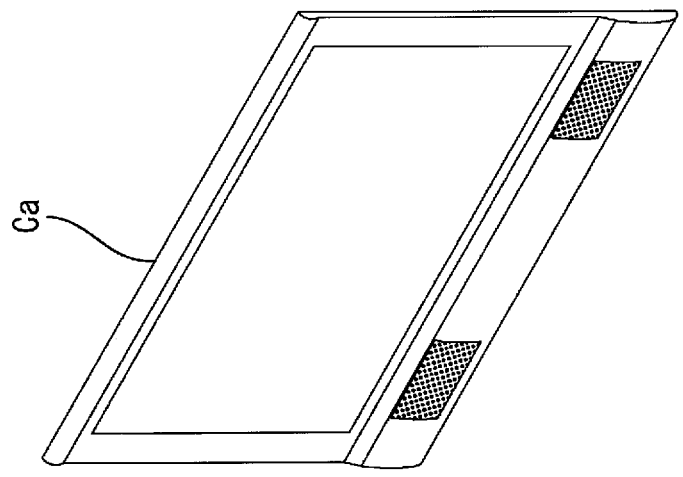
Figure 2:
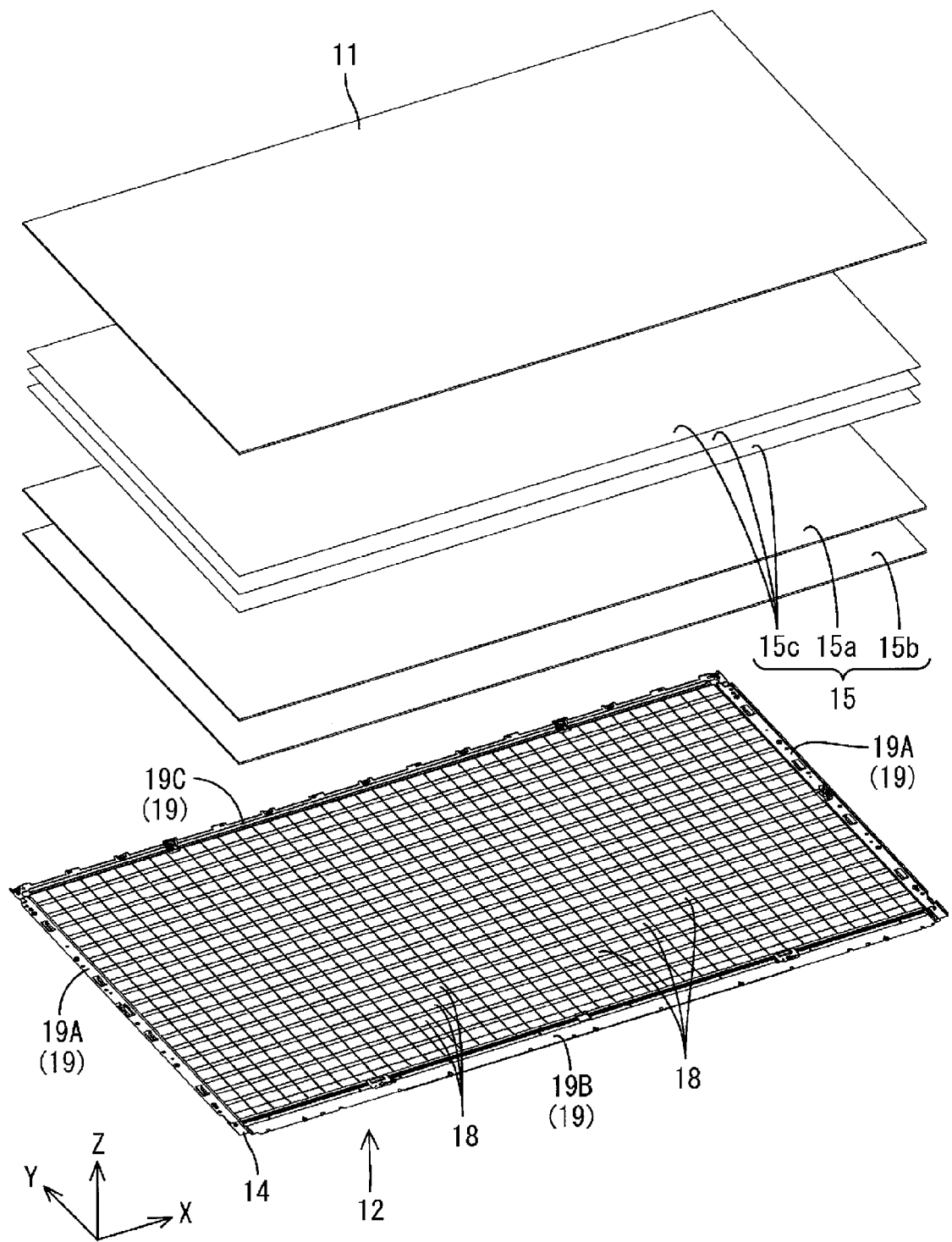
FIG. 2 is an exploded perspective view illustrating a general construction of a liquid crystal panel and a backlight unit.

As illustrated in FIG. 1, the television receiver TV includes the liquid crystal display device 10 (a display device), cabinets Ca and Cb, a power source P, and a tuner T. The cabinets Ca and Cb sandwich the liquid crystal display device 10 therebetween. The liquid crystal display device 10 is housed in the cabinets Ca and Cb. The liquid crystal display device 10 is held by a stand S in a vertical position in which a display surface 11a is set along a substantially vertical direction (the Y-axis direction). The liquid crystal display device 10 has a landscape rectangular overall shape. As illustrated in FIG. 2, the liquid crystal display device 10 includes a liquid crystal panel 11, which is a display panel, and a backlight unit 12 (an example of a lighting device), which is an external light source. The liquid crystal panel 11 and the backlight unit 12 are held together by a frame-shaped bezel 13 as illustrated in FIG. 2.

"The display surface 11a is set along the vertical direction" is not limited to a condition that the display surface 11a is set parallel to the vertical direction. The display surface 11a may be set along a direction closer to the vertical direction than the horizontal direction. For example, the display surface 11a may be 0° to 45° slanted to the vertical direction, preferably 0° to 30° slanted.

<Configuration of Liquid Crystal Panel>

Next, the liquid crystal panel 11 and the backlight unit 12 included in the liquid crystal display device 10 will be explained. The liquid crystal panel (a display panel) 11 has a rectangular plan view and includes a pair of transparent glass substrates bonded together with a predetermined gap therebetween and liquid crystals sealed between the substrates. On one of the glass substrates, switching components (e.g., TFTs), pixel electrodes and an alignment film are arranged. The switching components are connected to gate lines and the source lines that are perpendicular to each other. The pixel electrodes are connected to the switching components. On the other glass substrate, color filters including R (red) G (green) B (blue) color sections in predetermined arrangement, a counter electrode and an alignment film are arranged. Polarizing plates are arranged on outer surfaces of the glass substrates, respectively (see FIG. 5).

<Configuration of Backlight Unit>

Figure 4:
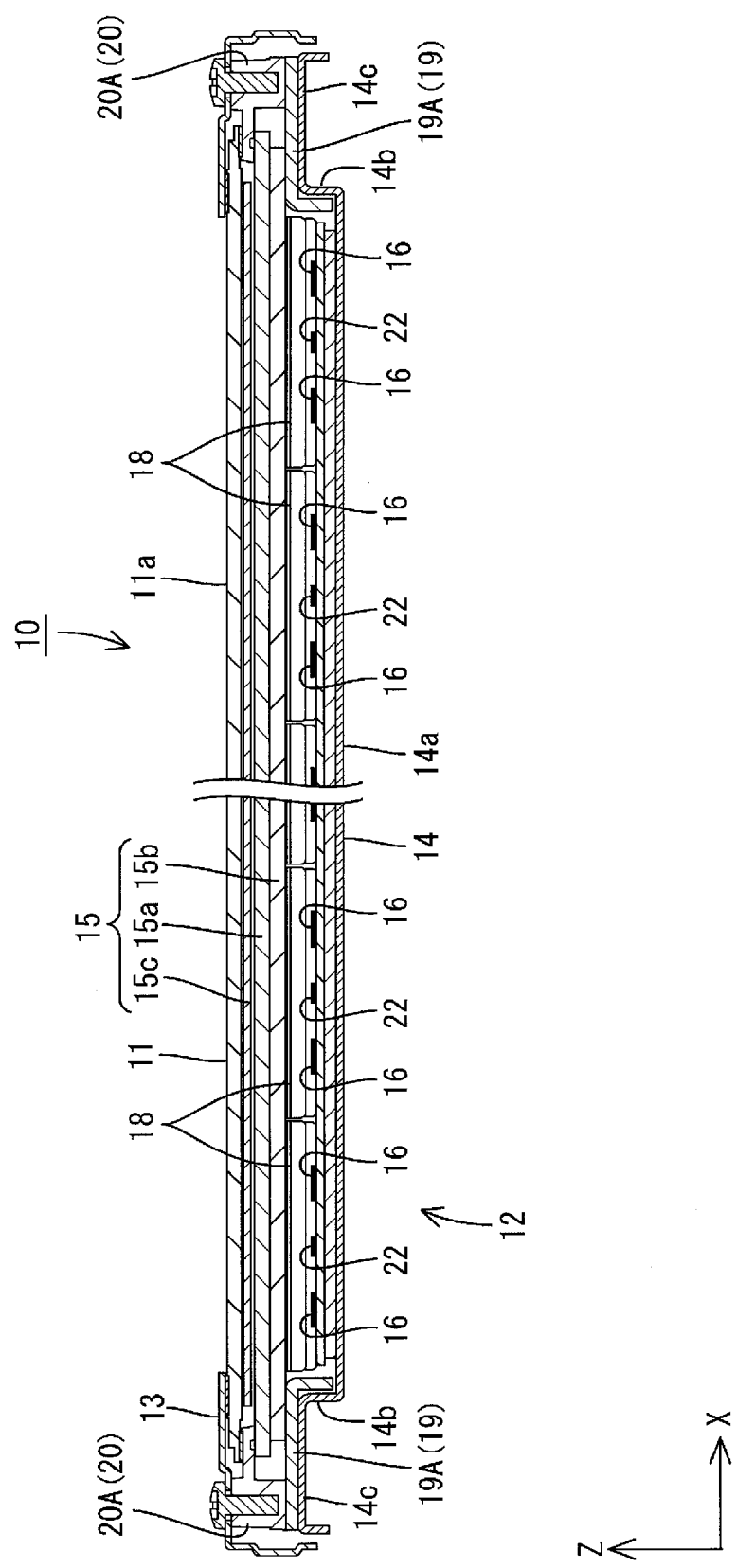
FIG. 4 is a cross-sectional view of a liquid crystal display device along the long side thereof.

Next, the backlight unit 12 will be explained in detail. As illustrated in FIG. 4, the backlight unit 12 includes a chassis 14, an optical member 15, light emitting diodes (an example of light emitting components, hereinafter referred to as LEDs) 16, LED boards 17 (an example of a base member) and light guide plates 18 (an example of a light guide member). The chassis 14 has a box-like overall shape and an opening on the front side (the liquid crystal panel 11 side, the light output side). The optical member 15 is arranged so as to cover the opening. The LEDs 16 are light sources arranged inside the chassis 14. The LEDs 16 are mounted on the LED boards 17. Rays of light emitted from the LEDs 16 are directed to the optical member 15 by the light guide plates 18.

The backlight unit 12 further includes a support member 19, a holddown member 20 and heat sinks 21. The support member 19 holds diffusers 15a and 15b included in the optical member 15 from the rear side. The holddown member 20 holds down the diffusers 15a and 15b from the front side. The heat sinks 21 are provided for dissipation of heat generated while the LEDs 16 emit light.

The backlight unit 12 includes a number of unit light emitters arranged in series. Each unit light emitter includes the light guide plate 18 and the LEDs 16 arranged in series. The LEDs 16 are disposed in side-edge areas of each light guide plate 18. A number of the unit light emitters (twenty of them in FIG. 3) are arranged in series along an arrangement direction (an Y-axis direction) in which the LEDs 16 and the light guide plates 18 are arranged in series, that is, in a tandem layout (see FIGS. 7 to 9). Furthermore, the backlight unit 12 includes a number of the unit light emitters (forty of them in FIG. 3) arranged parallel to each other in a direction substantially perpendicular to the tandem arrangement direction (the Y-axis direction) and along the display surface 11a (the X-axis direction). Namely, a number of the unit light emitters are arranged in a plane (i.e., in a two-dimensional parallel layout) along the display surface 11a (the X-Y plane) (see FIG. 3).

<Configuration of Chassis>

Figure 8:
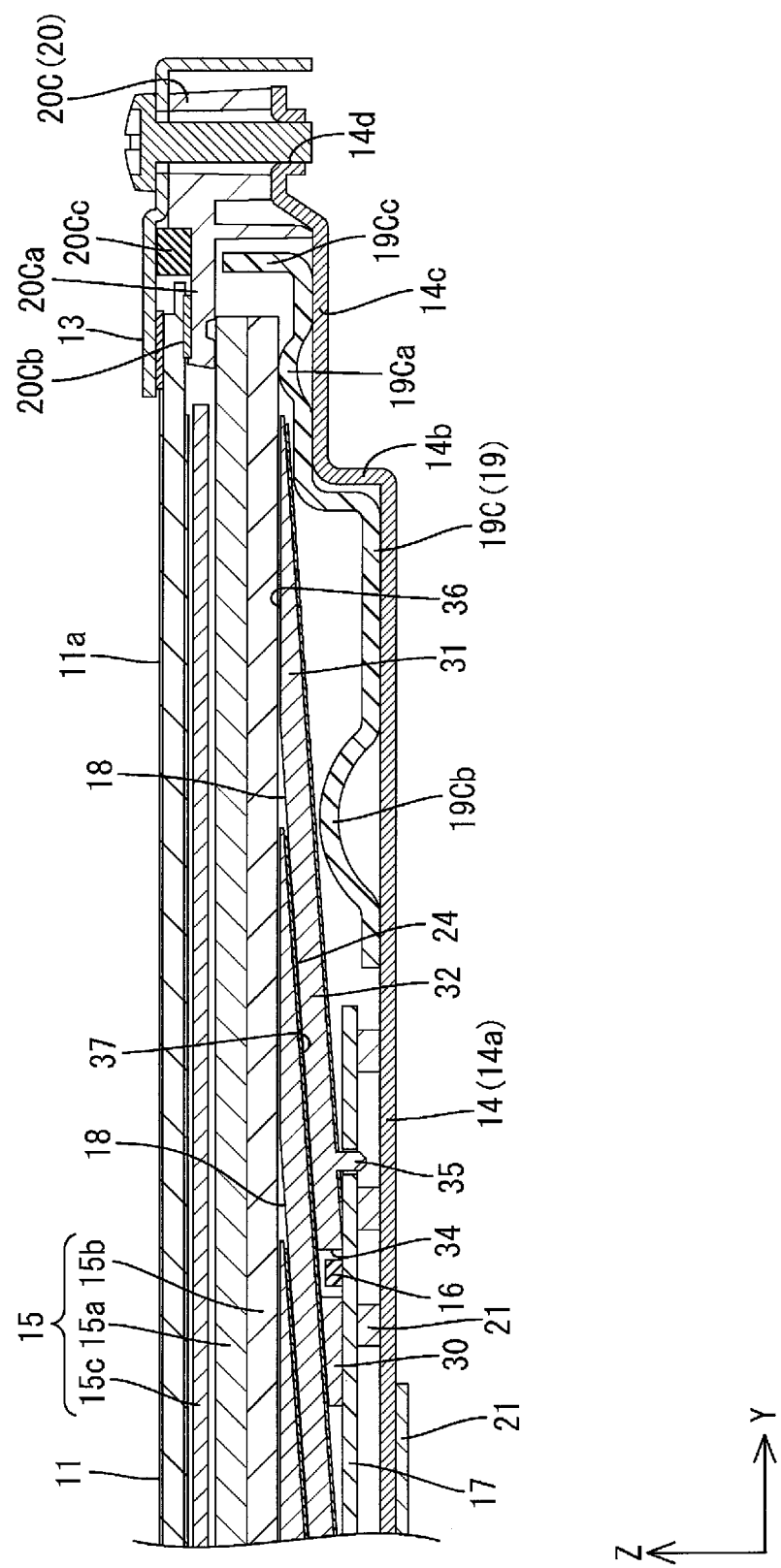
FIG. 8 is a magnified cross-sectional view of an upper end portion of the liquid crystal display device in FIG. 3 along the short side thereof.

Next, components of the backlight unit 12 will be explained in detail. The chassis 14 is made of metal and has a shallow-box-like overall shape (or a shallow-bowl-like overall shape) with the opening on the liquid panel 11 side as illustrated in FIG. 4. The chassis 14 includes a bottom plate 14a, side plates 14b and support plates 14c. The bottom plate 14a has a rectangular shape similar to the liquid crystal panel 11. The side plates 14b rise from the respective edges of the bottom plate 14a. The support plates 14c project outward from the respective end edges of the side plates 14b. The long-side direction and the short-side direction of the chassis 14 correspond to the horizontal direction (the X-axis direction) and the vertical direction (the Y-axis direction), respectively. The support plates 14c of the chassis 14 are configured such that the support member 19 and the holddown member 20 are placed thereon, respectively, from the front-surface side. Each support plate 14c has mounting holes 14d that are through holes for holding the bezel 13, the support member 19 and the holddown member 20 together with screws and formed at predetermined positions. One of the mounting holes 14d is illustrated in FIG. 8. An outer edge portion of each support plate 14c on the long side is folded so as to be parallel to the corresponding side plate 14b (see FIG. 4). The bottom plate 14a has insertion holes 14e that are through holes for inserting clips 23 therein (see FIGS. 5 and 6). The light guide plates 18 are mounted to the chassis with the clips 23. The bottom plate 14a also has mounting holes (not shown). The mounting holes are through holes for mounting the LED boards 17 with screws and formed at predetermined positions.

<Configuration of Optical Member>

As illustrated in FIG. 4, the optical member 15 is arranged between the liquid crystal panel 11 and the light guide plates 18. It includes the diffusers 15a and 15b arranged on the light guide plate 18 side, and an optical sheet 15c arranged on the liquid crystal panel 11 side. Each of the diffusers 15a and 15b includes a transparent resin base material with a predefined thickness and a large number of diffusing particles scattered in the base material. The diffusers 15a and 15b have functions of diffusing light that passes therethrough. The diffusers 15a and 15b having the same thickness are placed on top of each other. The optical sheet 15c is a thin sheet having a smaller thickness than that of the diffusers 15a and 15b. The optical sheet 15c includes three sheets placed on top of each other, more specifically, a diffusing sheet, a lens sheet and a reflection-type polarizing sheet arranged in this order from the diffuser 15a (15b) side (i.e., from the rear-surface side).

<Configuration of Support Member>

Figure 3:
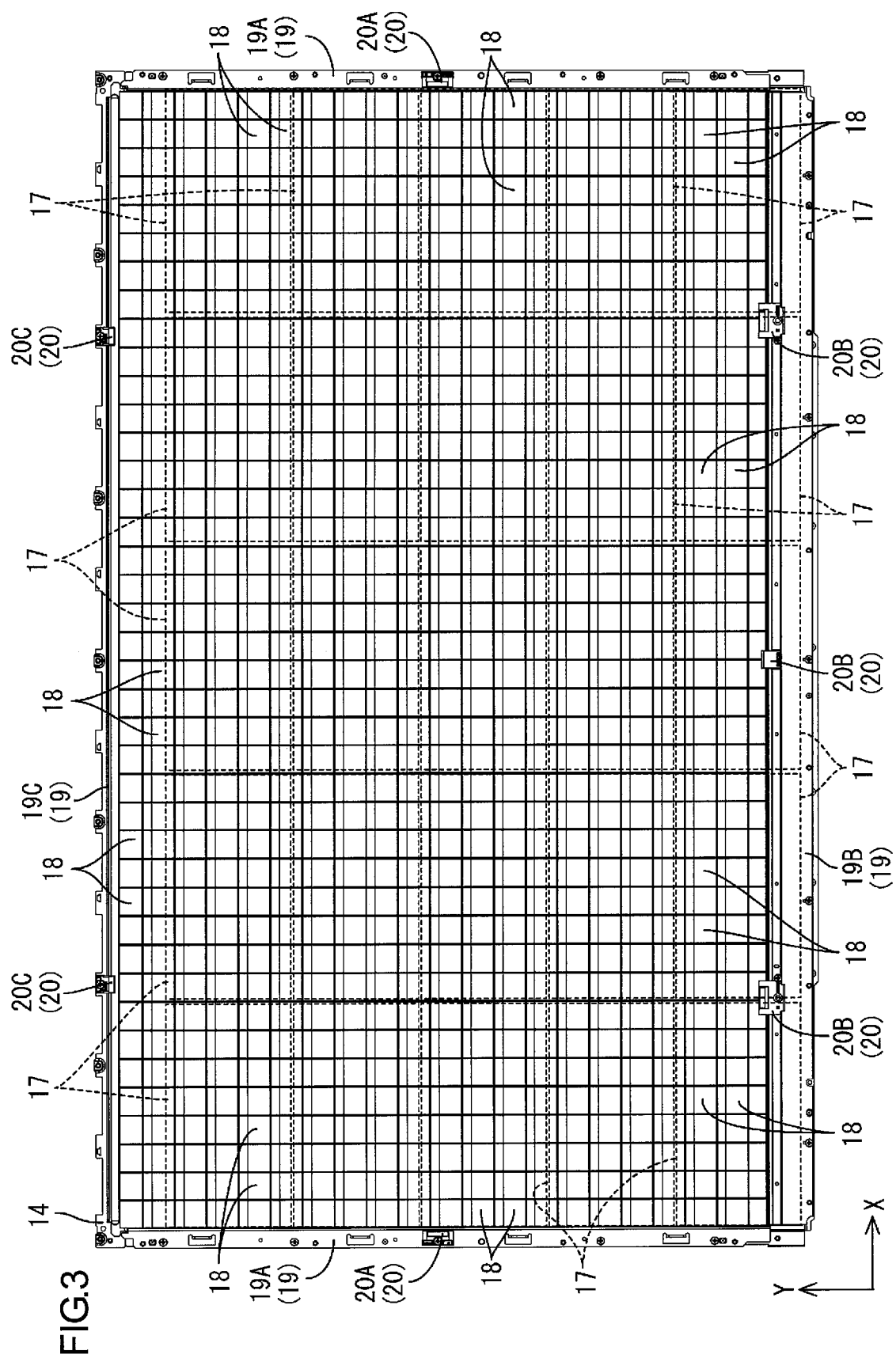
FIG. 3 is a plan view of the backlight unit.

The support member 19 is arranged on outer edge portions of the chassis 14 so as to support almost entire outer edge portions of the diffusers 15a and 15b. As illustrated in FIG. 3, the support member 19 includes a pair of short-side support parts 19A and two different long-side support parts 19B and 19C. The short-side support parts 19A are arranged so as to extend along the respective short sides of the chassis 14. The long-side support parts 19B and 19C are arranged so as to extend along the respective long sides of the chassis 14. The parts of the support member 19 are configured differently according to mounting locations. The symbols 19A to 19C are used for referring to the parts of the support member 19 independently. To refer to the support member 19 as a whole, the numeral 19 without the letters is used.

Figure 5:
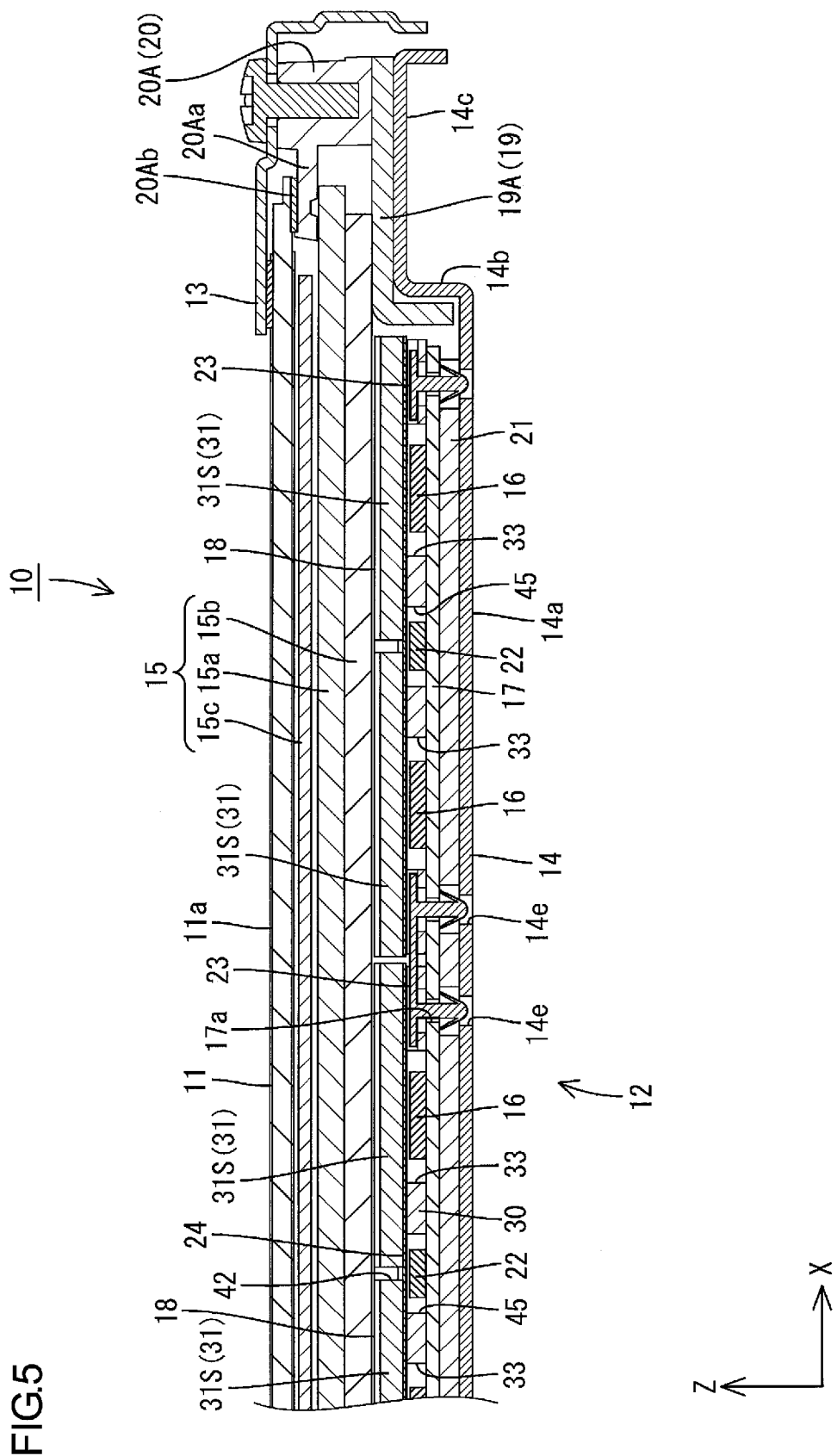
FIG. 5 is a magnified cross-sectional view of an end portion of the liquid crystal display device in FIG. 4.

As illustrated in FIGS. 4 and 5, the short-side support parts 19A have substantially same configurations. Each of them has a substantially L-shape cross section so as to extend along a surface of the support plate 14c and an inner surface of the side plate 14b. A part of each short-side support part 19A parallel to the support plate 14c receives the diffuser 15b in an inner area and a short-side holddown part 20A in an outer area. The short-side holddown part 20A will be explained later. The short-side support parts 19A cover substantially entire lengths of the support plates 14c and the side plates 14b on the short sides.

Figure 7:
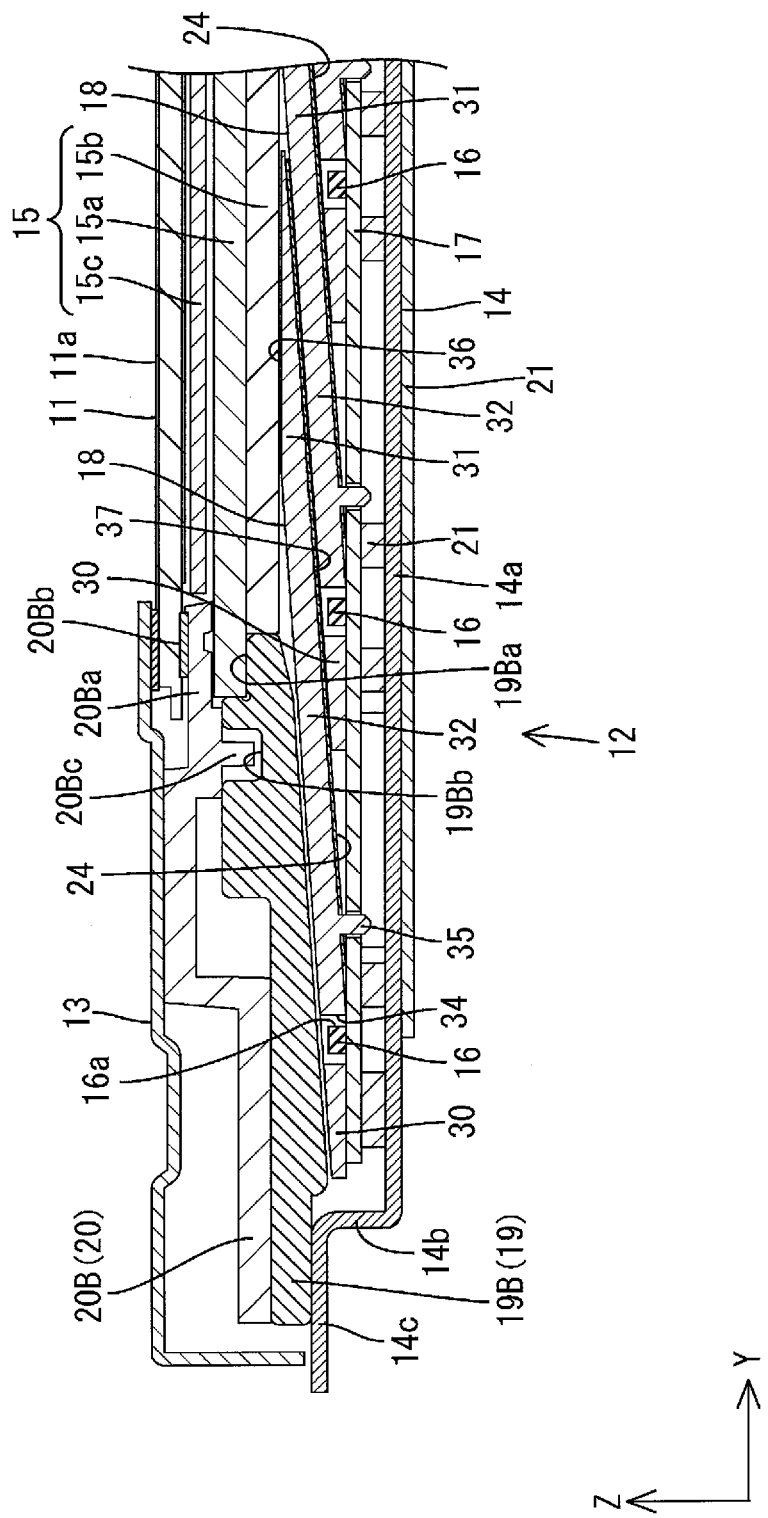
FIG. 7 is a magnified cross-sectional view of a lower end portion of the liquid crystal display device in FIG. 3 along the short side thereof.

The long-side support parts 19B and 19C are configured differently. Specifically, the first long-side support part 19B is arranged on the lower side in FIG. 3 (the lower side in the vertical direction) of the chassis 14. As illustrated in FIG. 7, it is arranged so as to extend along the inner surface of the support plate 14c and a surface of the adjacent light guide plate 18 located on the front-surface side (a surface opposite from the LED board 17 side). The first long-side support part 19B has a function of pressing the adjacent light guide plate 18 from the front-surface side. The first long-side support part 19B receives the diffuser 15a that is located on the front-surface side in the inner-edge area, and the first long-side holddown part 20B in the outer-edge area. The first long-side holddown part 20B will be explained later. The inner-edge area of the first long-side support part 19B has a stepped portion 19Ba formed so as to correspond to the shape of the outer edge area of the diffuser 15a that is located on the front-surface side. Adjacent to the stepped portion 19Ba, recesses 19Bb for receiving protrusions 20Bc of the first long-side holddown part 20B are formed in the first long-side support part 19B on the outer side with respect to the stepped portions 19Ba. The first long-side holding part 19B covers substantially entire lengths of the support plate 14c on the long side and non-luminous portions of the adjacent light guide plates 18 (a board mounting portion 30 and a light guide portion 32). The width of the first long-side support part 19B is larger than those of the other support parts 19A and 19C by an area that covers the non-luminous portion.

The second long-side support part 19C is arranged on the upper side of the chassis 14 in FIG. 3 (the upper side in the vertical direction). As illustrated in FIG. 8, the second long-side support part 19C has a crank-like cross section. It is arranged along the inner surfaces of the support plate 14c, the side plate 14b and the bottom plate 14a. A diffuser support protrusion 19Ca is formed in an area of the long-side support part 19C parallel to the support plate 14c so as to protrude on the front-surface side. The diffuser support protrusion 19Ca has an arch-shaped cross section. It is brought into contact with the diffuser 15b on the rear-surface side from the rear-surface side. A light guide plate support protrusion 19Cb is formed in an area of the second long-side support part 19C parallel to the bottom plate 14a so as to protrude on the front-surface side. The light guide plate support protrusion 19Cb has an arch-shaped cross section. It is brought into contact with the adjacent light guide plate 18 from the rear-surface side. The second long-side support part 19C has functions of receiving the diffusers 15a and 15b (i.e., support functions) and light guide plate 18. An area of the second long-side holding part 19C parallel to the support plate 14c and inside with respect to the diffuser support protrusion 19Ca is brought into contact with the end portion of the light guide plate 18 from the rear-surface side. The light guide plate 18 is supported at two points: at the end portion with the support protrusion 19Ca and at the base portion with the light guide support protrusion 19Cb. The second long-side support part 19C covers substantially entire areas of the support plate 14c and the side plate 14b on the long side. A projecting portion 19Cc rises from the outer edge of the second long-side holding part 19C so as to face the end surfaces of the diffusers 15a and 15b.

<Configuration of Holddown Member>

As illustrated in FIG. 3, the holddown member 20 is arranged on outer edge areas of the chassis 14. A width of the holddown member 20 is smaller than a dimension of the corresponding short sides of the chassis 14 and the diffusers 15a and 15b. Therefore, the holddown member 20 presses parts of the outer edge portion of the diffusers 15a. The holddown member 20 includes short-side holddown parts 20A arranged on the respective short-edge area of the chassis 14 and a plurality of long-side holddown parts 20B and 20C arranged on each long-edge area of the chassis 14. The parts of the holddown member 20 are configured differently according to mounting locations. The symbols 20A to 20C are used for referring to the parts of the holddown member 20 independently. To refer to the holddown member 20 as a whole, the numeral 20 without the letters is used.

The short-side holddown parts 20A are arranged around central portions of the respective short-edge areas of the chassis 14. They are placed on the outer-edge portions of the short-side support parts 19A and fixed with screws. As illustrated in FIGS. 4 and 5, each short-side holddown part 20A has a holding tab 20Aa that projects inward from a body that is screwed. The diffuser 15a is pressed by edge areas of the holding tabs 20Aa from the front-surface side. The liquid crystal panel 11 is placed on the holding tabs 20Aa from the front-surface side and held between the bezel 13 and the holding tabs 20Aa. Cushion materials 20Ab for the liquid crystal panel 11 are arranged on surfaces of the holding tabs 20Aa.

The long-side holddown parts 20B and 20C are configured differently. The first long-side holddown parts 20B are arranged on the lower side of the chassis 14 in FIG. 3 (the lower side in the vertical direction). As illustrated in FIG. 3, three first long-side holddown parts 20B are arranged at substantially equal intervals. One of them is arranged around the middle of the long-side area of the chassis 14 on the lower side in FIG. 3 and the other two are arranged on either side of the one arranged in the middle. They are placed on the outer edge area of the first long-side support part 19B and screwed. As illustrated in FIG. 7, each first long-side holding part 20B has a holding tab 20Ba on the inner side similar to the short-side holding parts 20A. A surface of the holding tab 20Ba on the rear-surface side presses the diffuser 15a. Surfaces on the front-surface side receive the liquid crystal display panel 11 via cushion materials 20Bb. The first long-side holddown parts 20B has widths larger than those of the other holddown parts 20A and 20C so as to correspond to the first long-side support parts 19B. Protrusions 20Bc for positioning the first long-side holddown parts 20B to the first long-side support parts 19B are formed on the surfaces of the first long-side holddown parts 20B on the rear-surface side.

The second long-side holddown parts 20C are arranged on the upper side of the chassis 14 in FIG. 3 (the upper side in the vertical direction). As illustrated in FIG. 3, two second long-side holddown parts 20C are eccentrically arranged in a long-edge area of the chassis 14 on the upper side in FIG. 3. They are directly placed on the support plate 14c of the chassis 14 and screwed. As illustrated in FIG. 8, each second long-side holddown part 20C has a holding tab 20Ca on the inner side, similar to the short-side holddown parts 20A and the first long-side holing parts 20B. Surfaces of the holding tabs 20Ca on the rear-surface side press the diffuser 15a and the surfaces on the front-surface side receive the liquid crystal panel 11 via cushion materials 20Cb. Other cushion materials 20Cc are provided between the holding tabs 20Ca of the second long-side holddown parts 20C and the bezel 13.

<Configuration of Heat Sink>

The heat sinks 21 are made of synthetic resin or metal having high thermal conductivity and formed in a sheet-like shape. As illustrated in FIGS. 5 and 7, the heat sinks 21 are arranged inside and outside the chassis 14, respectively. The heat sink 21 inside the chassis 14 is placed between the bottom plate 14a of the chassis 14 and the LED boards 17. It has cutouts for the components in some areas. The heat sink 21 outside the chassis 14 is attached to the rear surface of the bottom plate 14a of the chassis 14.

<Configuration of LED>

Figure 10:
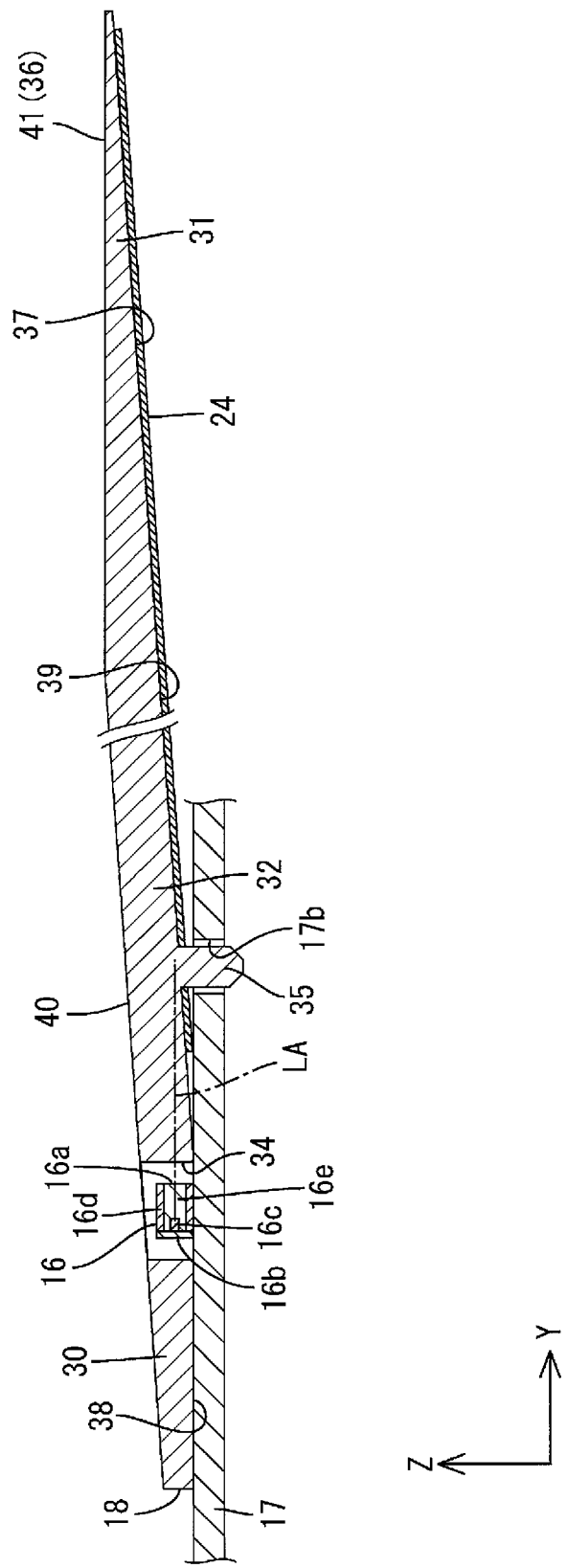
FIG. 10 is a magnified cross-sectional view of a light guide plate in FIG. 9.

As illustrated in FIG. 10, the LEDs 16 are surface-mounted to the LED boards 17, that is, the LEDs 16 are surface-mount LEDs. Each LED 16 has a block-like overall shape that is long in the horizontal direction. The LEDs 16 are side emitting LEDs. A side surface of each LED 16 that stands upright from a mounting surface is a light emitting surface 16a. The mounting surface is placed against the LED board 17 (i.e., the bottom surface that is in contact with the LED board 17). A light axis LA of light emitted from the LED 16 is substantially parallel to the display surface 11a of the liquid crystal display panel 11 (the light exit surface 36 of the light guide plate 18) (see FIGS. 7 and 10). Specifically, the light axis LA of the light emitted from the LED 16 matches the short-side direction (the Y-axis direction) of the chassis 14, that is, the vertical direction. The light travels toward the upper side in the vertical direction (a travel direction of the outgoing light from the light exit surface 16a) (see FIGS. 3 and 7). The light emitted from the LED 16 three-dimensionally radiates around the light axis LA in a specified angle range. The directivity thereof is higher than cold cathode tubes. Namely, angle distributions of the LED 16 shows a tendency that the emission intensity of the LED 16 is significantly high along the light axis LA and sharply decreases as the angle to the light axis LA increases. The longitudinal direction of the LED 16 matches the long-side direction of the chassis 14 (the X-axis direction).

As illustrated in FIG. 10, the LED 16 includes a plurality of LED chips 16c mounted on a board 16b that is arranged on an opposite side from the light emitting surface 16a (the rear-surface side). The LED chips 16c are light emitting components. The LED 16 is housed in the housing 16d and an inner space of the housing 16d is closed with a resin member 16e. The LED 16 includes three different kinds of the LED chips 16c with different main emission wavelengths. Specifically, each LED chip 16c emits a single color of light of red (R), green (G) or blue (B). The LED chips 16c are arranged parallel to each other along the longitudinal direction of the LED 16. The housing 16d is formed in a drum-like shape that is long in the horizontal direction and in white that provides high light reflectivity. The rear surface of the board 16b is soldered to a land on the LED board 17.

<Configuration of LED Board>

Each LED board 17 is made of synthetic resin and the surfaces thereof (including a surface facing the light guide plate 18) are in white that provides high light reflectivity. As illustrated in FIG. 3, the LED board 17 is formed in a plate-like shape having a rectangular plan view. The LED board 17 has a long dimension smaller than the short dimension of the bottom plate 14a and thus it can partially cover the bottom plate 14a of the chassis 14. The LED boards 17 are in a plane arrangement in a grid pattern on the surface of the bottom plate 14a of the chassis 14. In FIG. 3, five along the long-side direction of the chassis 14 by five along the short-side direction and a total of 25 LED boards 17 are arranged parallel to each other. Wiring patterns that are metal films are formed on each LED board 17 and the LEDs 16 are mounted in predetermined locations on the LED board 17. The LED boards 17 are connected to an external control board, which is not illustrated in the figures. The control board is configured to feed currents for turning on the LEDs 16 and to perform driving control of the LEDs 16. A number of LEDs 16 are arranged in a planar grid pattern on each LED board 17. The arrangement pitch of the LEDs 16 corresponds to the arrangement pitch of the light guide plates 18, which will be explained later. Specifically, eight along the long-side direction of the LED board 17 by four along the short-side direction thereof and a total of 32 LEDs 16 are arranged parallel to each other on the LED board 17. Photo sensors 22 are also mounted on the respective LED boards 17. Light emitting conditions of the LEDs 16 are determined by the photo sensors 22 and thus feedback control can be performed on the LEDs 16 (see FIGS. 4 and 11). Each LED board 17 has mounting holes 17a for receiving the clips 23 for mounting the light guide plates 18 (see FIG. 6). It also has positioning holes 17b for positioning the light guide plates 18 (see FIG. 10). The holes are formed in locations corresponding to mounting locations of the light guide plates 18.

<Configuration of Light Guide Plate>

Figure 9:
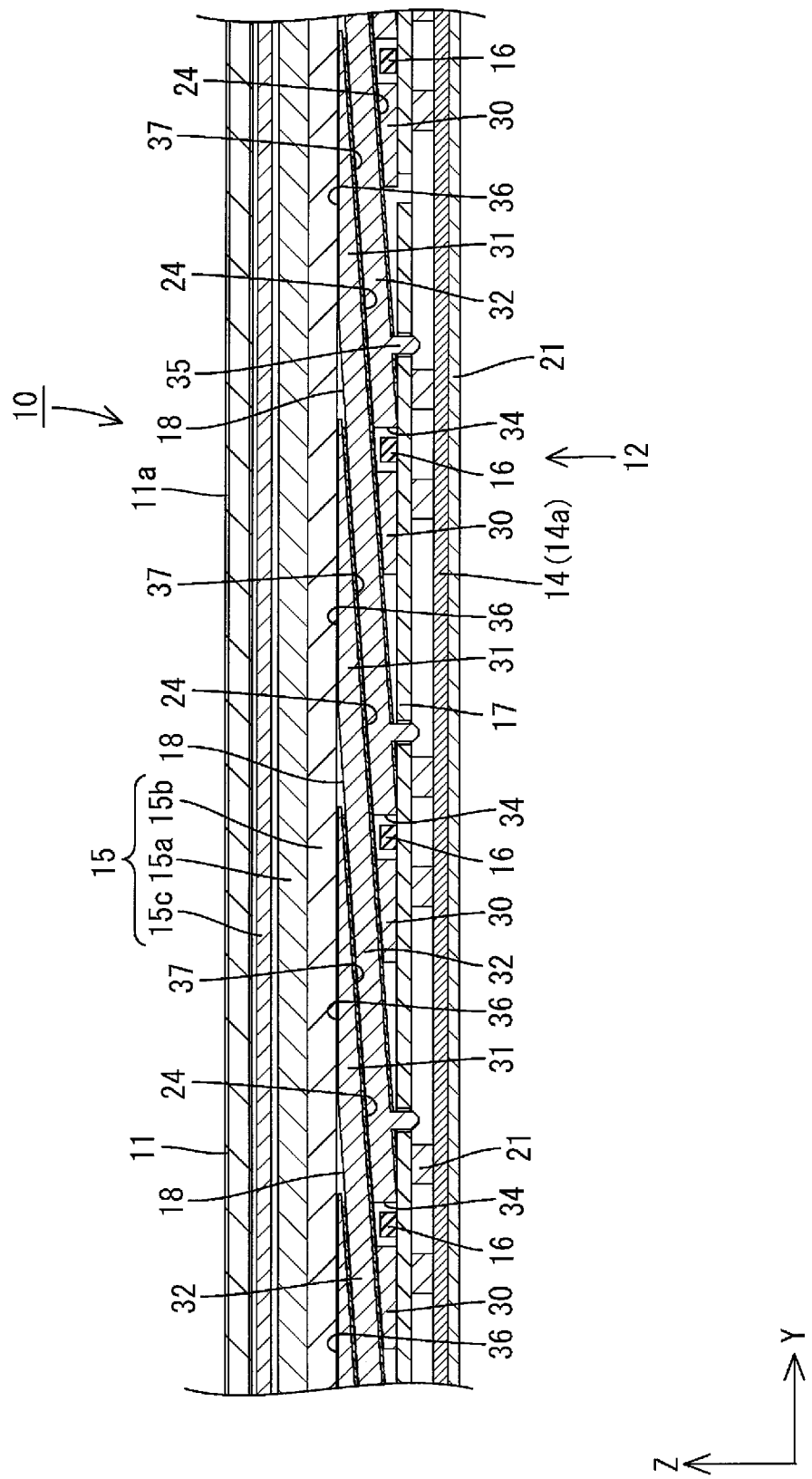
FIG. 9 is a magnified cross-sectional view of a middle portion of the liquid crystal display device along the short side thereof.
Figure 12:
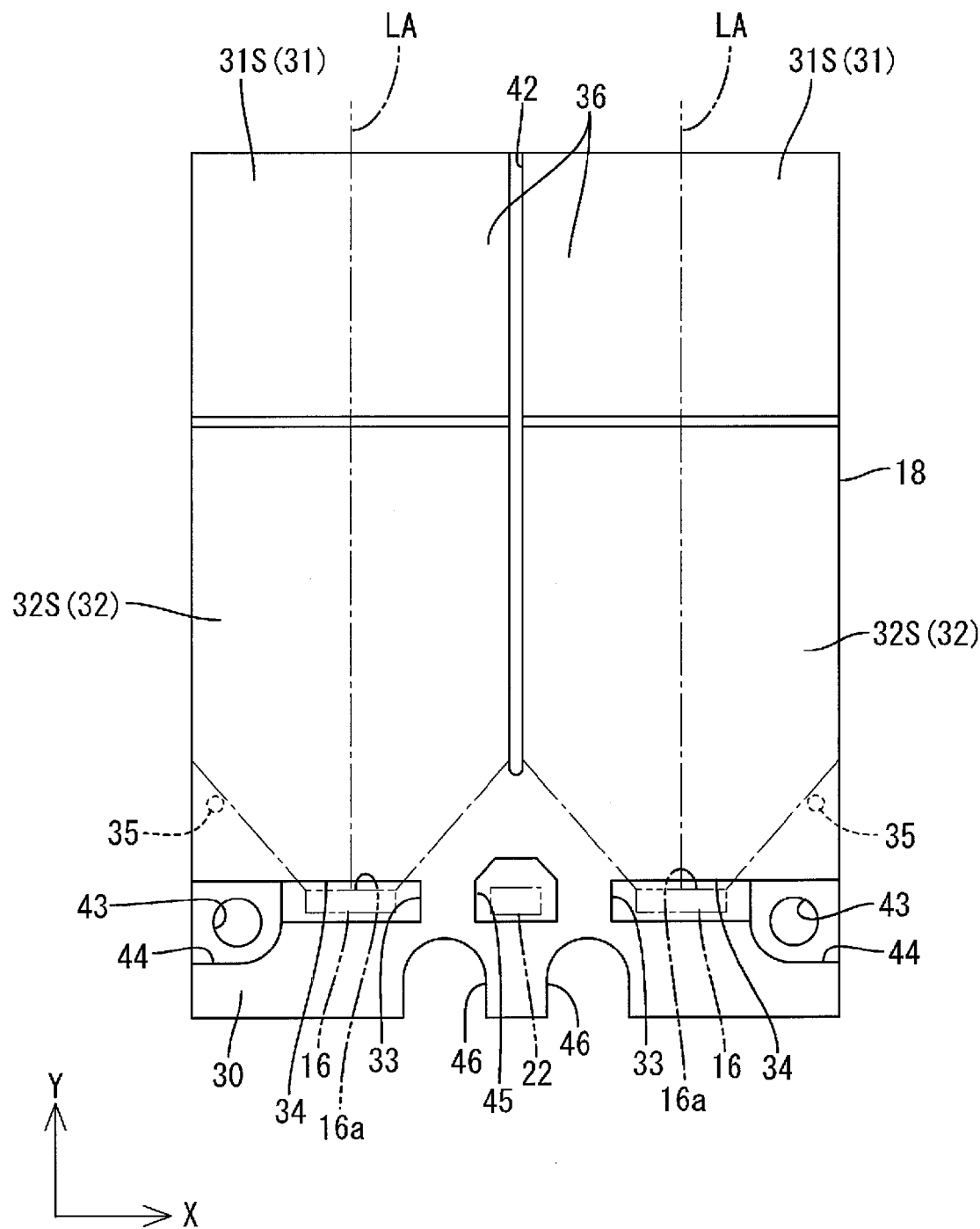
FIG. 12 is a plan view of the light guide plate.

Each light guide plate 18 is made of substantially transparent (i.e., having high light transmission capability) synthetic resin (e.g. polycarbonate), a reflective index of which is significantly higher than that of air. As illustrated in FIGS. 7 to 9, the light guide plate 18 draws the light emitted from the LED 16 in the vertical direction (the Y-axis direction), transmit the light therethrough and directs it toward the optical member 15 (in the Z direction). As illustrated in FIG. 12, the light guide plate 18 has a plate-like shape having a rectangular overall plan view. The long-side direction of the light guide plate 18 is parallel to the light axis LA of the LED 16 (the light emitting direction) and the short-side direction of the chassis 14 (the Y-axis direction or the vertical direction). The short-side direction is parallel to the long-side direction of the chassis 14 (the X-axis direction or the horizontal direction). Next, a cross-sectional structure of the light guide plate 18 along the long-side direction will be explained in detail.

As illustrated in FIGS. 7 to 9, the light guide plate 18 has a board mounting portion 30 that is located at one of end portions of the long dimension (on the LED 16 side) and attached to the LED board 17. The other end portion of the long dimension is configured as a light exit portion 31 from which light exits toward the diffusers 15a and 15b. The middle portion between the board mounting portion 30 and the light exit portion 31 is configured as a light guide portion 32. The light guide portion 32 is configured to direct the light to the light exit portion 31 without losing most of the light. Namely, the board mounting portion 30 (LED 16), the light guide portion 32 and the light exit portion 31 are arranged in this order from the LED 16 side along the long-side direction of the light guide plate 18, that is, along the light axis LA (the light emitting direction) of the LED 16. The board mounting portion 30 and the light guide portion 32 are non-luminous portions. The light exit portion 31 is a luminous portion. In the following description, a point ahead in a direction from the board mounting portion 30 toward the light exit portion 31 (the light emitting direction of the LED 16 or the direction toward right in FIGS. 7 to 9) is referred to as the front. A point behind in a direction from the light exit portion 31 toward the board mounting portion 30 (the direction toward left in FIGS. 7 to 9) is referred to as the rear.

<Configuration of Light Entrance Surface>

Figure 11:
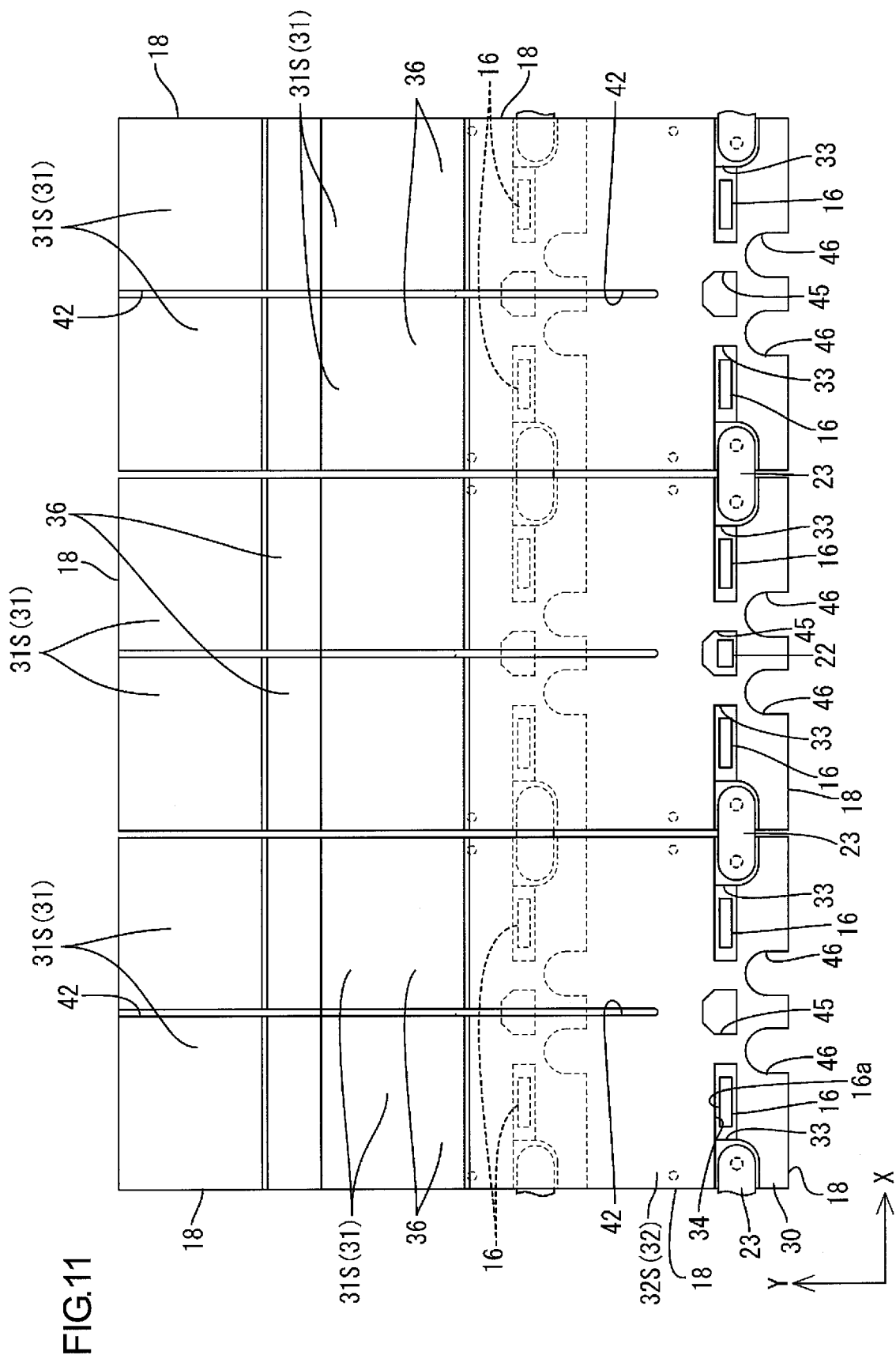
FIG. 11 is a plan view illustrating a layout of light guide plates.

As illustrated in FIG. 11, in front of the board mounting portion 30, an LED holding space 33 is formed so as to run through in the Z-axis direction. A surface of one of inner walls of the LED holding space 33, which faces the light emitting surface 16a of the LEC 16 (i.e., the front surface), is a light entrance surface 34 through which light from the LED 16 enters. The light entrance surface 34 is located between the board mounting portion 30 and the light guide portion 32. About entire peripheries of the light guide portion 32 are flat and smooth surfaces. Scattered reflections do not occur at interfaces between the surfaces and external air layers. Incident angles of light that strikes the interfaces are larger than a critical angle and thus the light is totally reflected at multiple times while traveling through the light guide portion 32 and guided to the light exit portion 31. Therefore, the light is less likely to leak from the light guide portion 32 and reach other light guide plates 18. The LED chips 16c of the LED 16 emits rays of light in respective RGB colors. Three different colors of the rays are mixed as the rays of light travel through the light guide portion 32 and turn into white. The white light is guided to the light exit portion 31. Furthermore, positioning protrusion 35 protrudes toward the rear-surface side. It is located in an area of the light guide portion 32 close to the board mounting portion 30 (close to a rear-end area). The light guide plate 18 is positioned with respect to the LED board 17 in the X-axis direction and the Y-axis direction when the protrusion 35 is inserted in the positioning hole 17b of the LED board 17.

<Configuration of Light Exit Surface>

A surface of the light exit portion 31 which faces toward the front-surface side is about an entire area of the surface opposite the diffuser 15b is a light exit surface 36. The light exit surface 36 is a substantially flat and smooth surface. It is substantially parallel to the plate surfaces of the diffusers 15a and 15b (or the display surface 11a of the liquid crystal display panel 11) and substantially perpendicular to the light entrance surface 34. Therefore, the light axis of light directing from the light exit surface 36 toward the optical member 15 is substantially perpendicular to the light axis LA of the light from the LED 16. The light axis of light directing from the light exit surface 36 toward the optical member 15 is substantially perpendicular to the optical member 15, and the light axis of light from the LED 16 is substantially parallel to the optical member 15.

<Configuration of Scattering Surface>

The surface of the light exit portion 31 on the rear-surface side (the surface opposite from the light exit surface 36 or the surface facing the LED board 17) is processed so as to form microscopic asperities thereon. The surface with microscopic asperities is a scattering surface 37 that scatters light at the interface. The light that travels through the light guide plate 18 is scattered by the interface of the scattering surface 37. Namely, light rays strike the light exit surface 36 at the incident angles smaller than the critical angle (light rays that break the total reflection) and exit through the light exit surface 36. The scattering surface 37 has a plurality of lines of perforations 37a that extend straight along the short-side direction of the light guide plate 18 and parallel to each other. The arrangement pitch (the arrangement interval) of the perforations 37a is larger on the rear-end side of the light exit portion 31 than on the front-end side and gradually decreases. Namely, the density of the perforations 37a of the scattering surface 37 is low on the rear-end side and that is high on the front side. The closer to the LED 16 the lower the density becomes, and the farther from the LED 16 the higher the density becomes, that is, the perforations 37a formed in a gradational arrangement. With this configuration, brightness in the area of the light exit portion 31 closer to the LED 16 is less likely to differ from brightness in the area of the light exit portion 31 father from the LED 16. As a result, the uniform in-plane brightness distribution can be achieved on the light exit surface 36. The scattering surface 37 is provided in the about entire area of the light exit portion 31. The entire area substantially overlaps the light exit surface 36 in the plan view.

<Configuration of Reflection Sheet>

Figure 13:
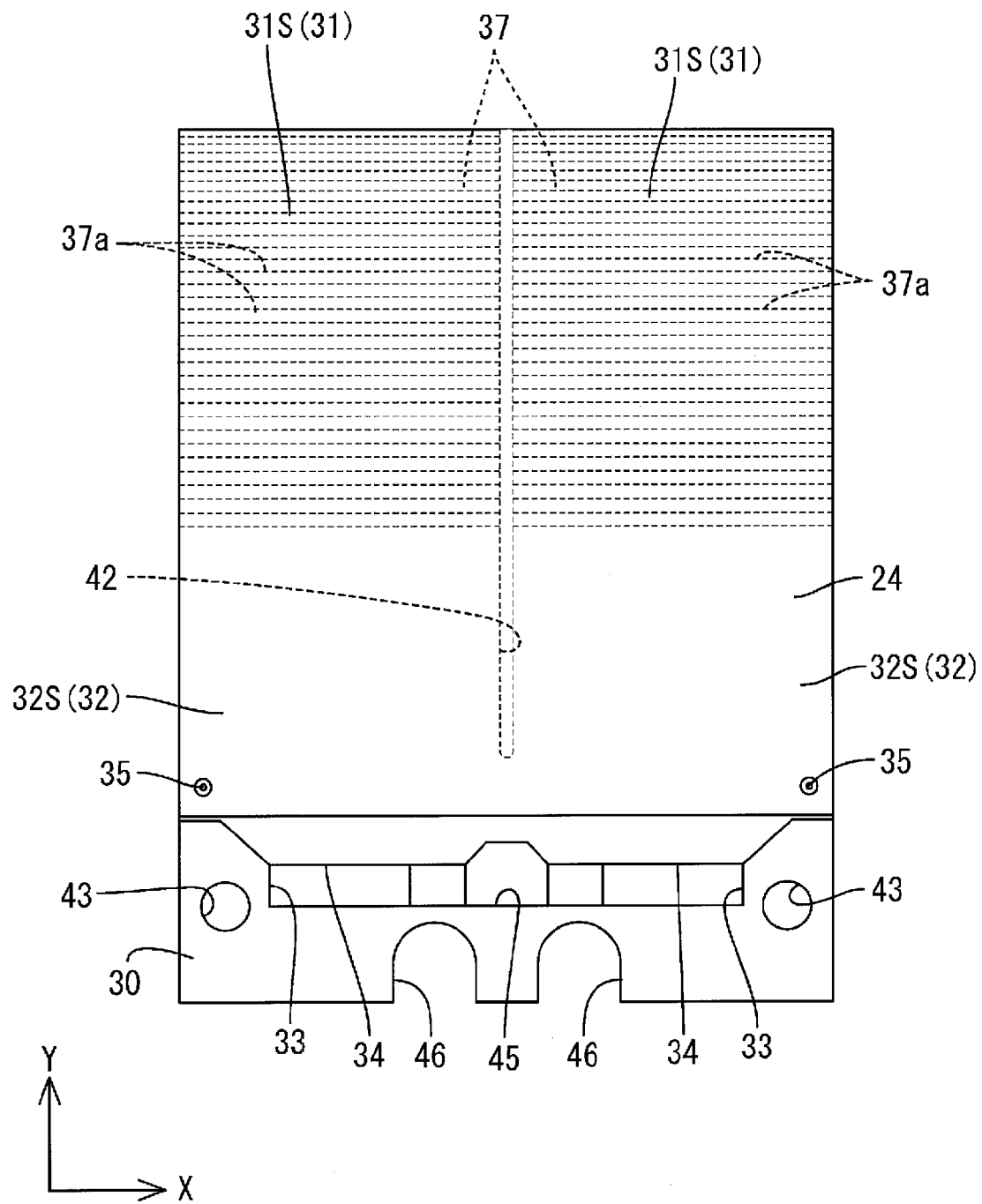
FIG. 13 is a bottom view of the light guide plate.

As illustrated in FIG. 13, a reflection sheet 24 is placed on surfaces of each light exit portion 31 and each light guide portion 32 (including the scattering surface 37) on the rear-surface side. Light reflects off the reflection sheet 24 to be directed into the light guide plate 18. Wide-type reflection sheets 24, which are not illustrated in the figures, and narrow-type reflection sheets 24, one of which is illustrated in FIG. 13, are used. Each wide-type reflection sheet 24 has a width larger than a size of the light guide plate 18 measuring in the X-axis direction. Each wide-type reflection sheet 24 has a width substantially same as the size of the light guide plate 18 measuring in the X-axis direction. The wide-type reflection sheets 24 and the narrow-type reflection sheets 24 are alternately arranged in the X-axis direction. Specifically, the wide-type reflection sheet 24 is attached to the light guide plate 19 in the middle in FIG. 11, and the narrow-type reflection sheets 24 are attached to the light guide plates 18 on the right and the left sides in FIG. 11, respectively. The reflection sheets 24 cover not only the gaps S in the slits 42 but also gaps S between the adjacent light guide plates 18. Namely, the wide-type reflection sheets 24 extend over the respective gaps S between the light guide plates 18 along the rear surfaces of the light exit portions 31 and the light guide portions 32.

Each reflection sheet 24 is made of synthetic resin (for example, a resin film such as white PET) and the surface thereof is white that provides high light reflectivity. The reflection sheet 24 is disposed so as to cover about entire areas of the light exit portion 31 and the light guide portion 32 in the plan view as illustrated in FIG. 13. With the reflection sheet 24, the light that travels through the light guide plate 18 does not leak to the rear-surface side and the light that is scattered at the scattering surface 37 is effectively directed toward the light exit surface 36. The reflection sheet 24 is attached to the light guide plate 18 with transparent adhesives at points in side edge areas that are less likely to interfere with light that travels through the light guide plate 18. The reflection sheet 24 has holes through which the positioning protrusions 35 are passed. The side-edge surfaces and the front-end surface (distal-end surface) of each light exit portion 31 are flat and smooth surfaces similar to those of the light guide portion 32. Therefore, light is less likely to leak.

As illustrated in FIG. 10, the light guide plate 18 has flat surfaces 38 and 41 on the front-surface side (the surface opposite the diffusers 15a and 15b, including the light exit surface 36) and on the rear-surface side (the surface opposite the LED board 17), respectively. The flat surfaces 38 and 41 are substantially parallel to the X-Y plane (or the display surface 11a). The light guide plate 18 also has sloped surfaces 39 and 40. The sloped surfaces 39 and 40 are sloped with respect to the X-axis and the Z-axis. Specifically, the surface of the board mounting portion 30 on the rear-surface side is a mounting surface that is placed on the LED board 17. To make the mounting condition stable, the flat surface 38 (the surface parallel to the main board surface of the LED board 17) is provided. The surfaces of the light guide portion 32 and the light exit portion 31 on the rear-surface side form a continuous sloped surface 39. The board mounting portion 30 of the light guide plate 18 is in contact with the LED board 17 and fixed. The light guide portion 32 and the light exit portion 31 are separated from the LED board 17, that is, they are not in contact with the LED board 17. The light guide plate 18 is held in a cantilever manner with the board mounting portion 30 on the rear side as an anchoring point (or a supporting point) and a front end as a free end.

The surfaces of entire parts of the board mounting portion 30 and the light guide portion 32 and a part of the light exit portion 31 close to the light guide portion 32 on the front-surface side form the continuous sloped surface 40. The sloped surface 40 is sloped at about the same angle and parallel with respect to the sloped surface 39 on the rear-surface side. Namely, the thickness of the light guide plate 18 is substantially constant in the entire light guide portion 32 and a part of the light exit portion 31 close to the light guide portion 32 (close to the LEE 16). The surface of the light exit portion 31 on the front side (away from the LED 16) on the front-surface side is the flat surface 41. Namely, the light exit surface 36 includes the flat surface 41 and the sloped surface 40. Most part of the light exit surface 36 on the front side is the flat surface 41 and a part thereof on the light guide portion 31 side is the sloped surface 40. The thickness of the board mounting portion 30 decreases toward the rear end (as further away from the light guide portion 32), that is, the board mounting portion 30 has a tapered shape. A part of the light exit portion 31 adjacent to the light guide portion 32 has the sloped surface 40 on the front-surface side and thus the thickness thereof is constant. A part of the light exit portion 31 located more to the front than the above part has the flat surface 41 on the front-surface side. Therefore, the thickness gradually decreases toward the front end (as further away from the light guide portion 32), that is, the light exit portion 31 has a tapered shape. A long dimension (a dimension measuring in the Y-axis direction) of the flat surface 41 on the front-surface side is smaller than that of the flat surface 38 on the rear-surface side. Therefore, the front-end area of the light exit portion 31 is smaller in thickness than the rear-end area of the board mounting portion 30. Moreover, a surface area of the front-end area (distal-end area) of the light exit portion 31 is smaller than that of the rear-end area of the board mounting portion 30. All peripheral surfaces of each light guide plate 18 (including side surfaces and a front surface) are vertically straight surfaces along the Z-axis direction.

As illustrated in FIG. 12, each light guide plate 18 having the above cross sectional structure has a pair of the LED holding spaces 33 for holding the LEDs 16. The light guide plate 18 is configured to receive rays of light from two different LEDs 16 and guide them to the diffusers 15a and 15b in optically independent conditions. The light guide plate 18 will be explained in detail together with a planar arrangement of the components of the light guide plate 18.

<Configuration of LED Holding Space>

The light guide plate 18 has a symmetric shape with a line that passes through the middle of the short side (in the X-axis direction) as a line of symmetry. The LED holding spaces 33 of the board mounting portion 30 are arranged symmetrically a predetermined distance away from the middle of the short side (in the X-axis direction) of the light guide plate 18. Each LED holding space 33 has a landscape rectangular shape in plan view and a size slightly larger than an overall size of the LED 16. The height (the dimension measuring in the Z-axis direction) and the width (the dimension measuring in the X-axis direction) are slightly larger than those of the LED 16. The surface area of the light entrance surface 34 is significantly larger than the light exit surface 16a. Therefore, the rays of light emitted radially from the LED 16 enter the light guide plate 18 without any loss.

<Configuration of Clip>

At the middle of a short dimension of the light guide plate 18, a slit 42 is formed so as to divide the light guide portion 32 and the light exit portion 31 into right and left. The slit 42 runs through the light guide plate 18 in the thickness direction (the Z-axis direction) and toward the front along the Y-axis direction with a constant width. Edge surfaces of the light guide plate 18, which face the slit 42, form side-edge surfaces of the divided light guide portion 32S and the divided light exit portion 31S. Each side-edge surface includes a flat surface that is substantially straight along the Z-axis direction. The rays of light passing through the light guide plate 18 totally reflect off an interface between the light guide plate 18 and the air layer in the slit 42. Therefore, the rays of light do not travel or mix together between the divided light guide portions 32S that faces each other via the slit 42 or between the divided light exit portions 31S that faces each other via the slit 42. The divided light guide portions 32S and the divided light exit portions 31A are optically independent from each other. The rear end of the slit 42 is slightly more to the front than the positioning protrusion 35 and more to the rear than a lighting area of each LED 16 (the area within an angular range with the light axis LA of the LED 16 as the center and indicated by alternate long and short dash lines in FIG. 12). With this configuration, the rays of light emitted from the LED 16 do not directly enter the adjacent divided light guide portion 32S that is not a target to be lit. The positioning protrusions 35 are symmetrically located on the outer end areas of the divided light guide portions 32S (the end portions away from the slit 42) more to the rear than the lighting areas of the respective LEDs 16. Therefore, the positioning protrusions 35 are less likely to be obstacles in optical paths. The slit 42 does not run to the board mounting portion 30. Therefore, the divided light guide portions 32S connect to each other and continue into the board mounting portion 30. This provides mechanical stability in mounting conditions. The light guide plate 18 includes two unit light guide plates (corresponding to the divided light guide portion 32S and the divided light exit portion 31S). The unit light guide plates are optically independent from each other and provided each for each LED 16. The unit light guide plates are connected to each other together with the board mounting portion 30. This simplifies mounting of the light guide plate 18 to the LED board 17. As illustrated in FIG. 13, the reflection sheet 24 is placed over the slit 42.

<Configuration of Clip Mounting Hole>

Figure 6:
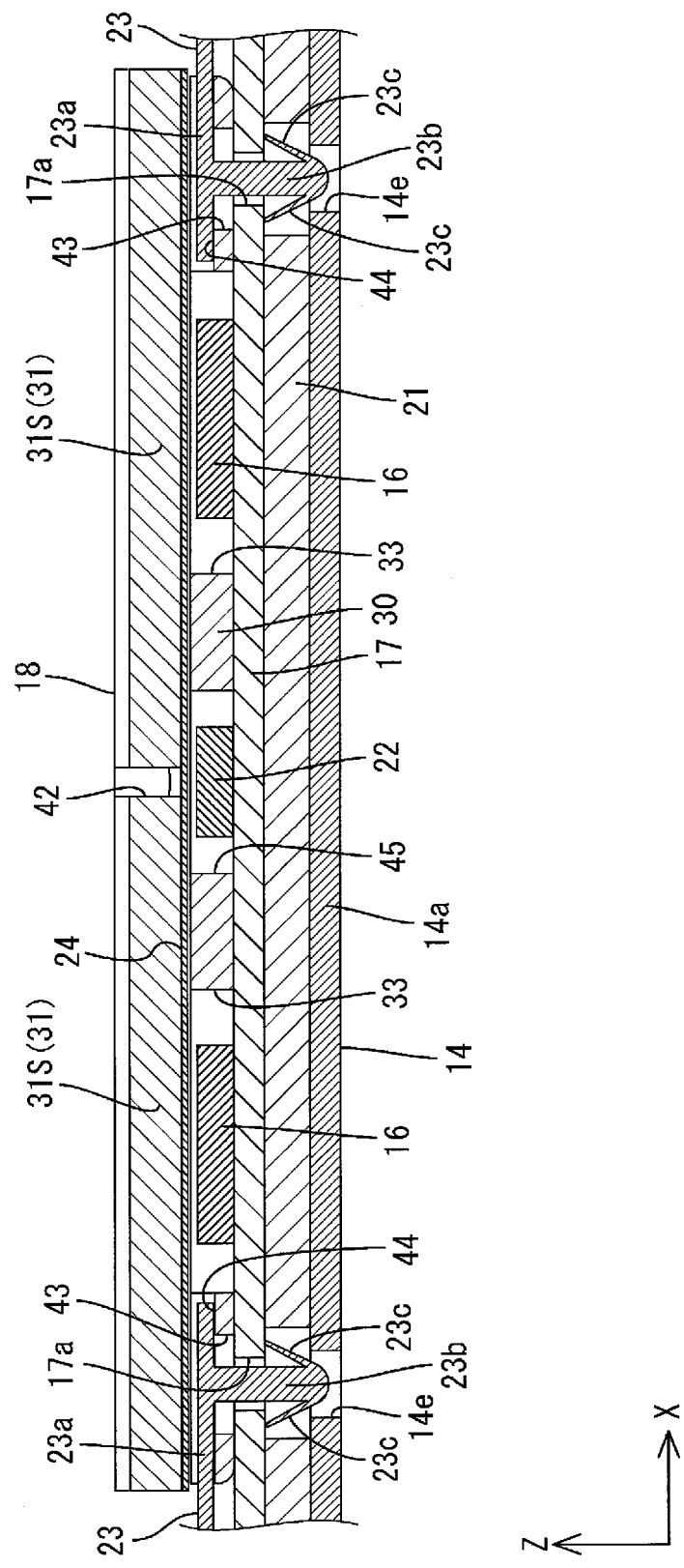
FIG. 6 is a magnified cross-sectional view of a light guide plate illustrated in FIG. 5.

Clip insertion holes 43 are formed in the side-edge areas of the board mounting portion 30 (in the areas more to the outsides than the LED holding space 33). The clip mounting holes 43 are through holes provided for mounting the light guide plate 18 to the LED board 17. As illustrated in FIG. 6, each clip 23 includes a mounting plate 23a, an insertion post 23b and a pair of stoppers 23c. The mounting plate 23a is parallel to the board mounting portion 30. The insertion post 23b projects from the mounting plate 23a in the thickness direction (the Z-axis direction) of the board mounting portion 30. The stoppers 23c project from an end of the insertion post 23b so as to return toward the mounting plate 23a. The insertion post 23b of the clip 23 is inserted in the clip insertion hole 43 of the board mounting portion 30 and the mounting hole 17a of the LED board 17. The stoppers 23c of the clip 23 are held to the edge portions around the mounting hole 17a. As a result, the light guide plate 18 is mounted and fixed to the LED board 17. As illustrated in FIGS. 5 and 11, one kind of the clips 23 has a single insertion post 23b projecting from the mounting plate 23a and the other kind has two insertion posts 23b projecting from the mounting plate 23a. The first kind of the clips 23 are inserted in the clip insertion holes 43 (FIG. 6) located in the end areas inside the chassis 14. The other kind of the clips 23 are arranged so as to connect two light guide plates 18 that are parallel to each other and thus the two light guide plates 18 are collectively mountable. As illustrated in FIGS. 6 and 12, clip receiving recesses 44 for receiving the mounting plates 23a of the clips 23 are provided around the clip insertion holes 43. With the clip receiving recesses 44, the mounting plates 23a do not project from the board mounting portions 30 toward the front and thus spaces can be reduced, that is, the thickness of the backlight unit 12 can be reduced.

<Configuration of Photo Sensor Holding Space>

As illustrated in FIG. 12, each board mounting portion 30 has a photo sensor holding space 45 between the LED holding spaces 33. The photo sensor holding space 45 is a through hole for holding the photo sensor 22 mounted on the LED board 17. A predetermined number of the photo sensors 22 are arranged irregularly, that is, between specific LEDs on the LED boards 17. Namely, some photo sensor holding spaces 45 of the light guide plates 18 in the chassis 14 do not hold the photo sensors 22 (for example, see FIG. 11). Each board mounting portion 30 has cutouts 46 between the photo sensor holding space 33 and each of the LED holding spaces 33 on the board mounting portion 30. The cutouts 46 are located symmetrically. Each cutout 46 runs completely through the board mounting portion 30 similar to the LED holding portion 33 but opens on the rear end. A screw (not shown) for fixing the LED board 17 to the chassis 14 is inserted in the cutout 46. Some of the cutouts are not used for light guide plates 18 in the chassis 14, as some photo sensor holding spaces 45 are not used.

<Arrangement of Light Guide Plates>

As described above, a large number of the light guide plates 18 are placed in a grid and in a planar arrangement within the area of the bottom plate 14a of the chassis 14. The arrangement of the light guide plates 18 will be explained in detail. First, the arrangement in the tandem-arrangement direction (the Y-axis direction) will be explained. As illustrated in FIG. 9, the light guide plates 18 are mounted such that the light guide portions 32 and the light exit portions 31 are separated from the LED boards 17. The light guide portion 32 and the light exit portion 31 of each light guide plate 18 overlap about entire areas of the board mounting portion 30 and the light guide portion 32 of the adjacently located light guide plate 18 on the front side (the upper side in the vertical direction) from the front side. Namely, the board mounting portion 30 and the light guide portion 32 of the light guide plate 18 on the front side overlap the light guide portion 32 and the light exit portion 31 of the light guide plate 18 on the rear side in the plan view. The board mounting portion 30 and the light guide portion 32, which are the non-luminous portion of the light guide plate 18, are covered with the light guide portion 32 and the light exit portion 31 of the adjacent rear light guide plate 18. Namely, the board mounting portion 30 and the light guide portion 32 are not bare on the diffuser 15b side and only the luminous portion, that is, the light exit surface 36 of the light exit portion 31 is bare. With this configuration, the light exit surfaces 36 of the light guide plates 18 are continuously arranged without gaps in the tandem-arrangement direction. About entire rear surfaces of the light guide portion 32 and the light exit portion 31 are covered with the reflection sheet 24. Therefore, even when light is reflected by the light entrance surface 34 and leak occurs, the leak light does not enter the adjacent light guide plate 18 on the rear side. The light guide portion 32 and the light exit portion 31 of the light guide plate 18 on the rear side (the front-surface side) is mechanically supported by the adjacent overlapping light guide plate 18 on the front side (the rear-surface side) from the rear side. The sloped surface 40 of the light guide plate 18 on the front-surface side and the sloped surface 39 on the rear-surface side have substantially same slope angles and are parallel to each other. Therefore, gaps are not created between the overlapping light guide plates 18 and the light guide plates 18 on the rear-surface side support the light guide plates 18 on the front-surface side without rattling. Only front-side parts of the light guide portions 32 of the light guide plates 18 on the rear side cover the board mounting portions 30 of the light guide plates 18 on the front side. The rear-side parts face the LED boards 17.

The arrangement in a direction perpendicular to the tandem-arrangement direction (the X-axis direction) is illustrated in FIGS. 5 and 11. The light guide plates 18 do not overlap each other in the plan view. They are arranged parallel to each other with predetermined gaps therebetween. With the gaps, air layers are provided between the light guide plates 18 adjacent to each other in the X-axis direction. Therefore, the rays of light do not travel or mix between the light guide plates 18 adjacent to each other in the X-axis direction and thus the light guide plates 18 are optically independent from each other. The size of the gaps between the light guide plates 18 is equal to or smaller than that of the slit 42.

As illustrated in FIGS. 3 and 11, a large number of the light guide plates 18 are arranged in the planar arrangement inside the chassis 14. The light exit surface of the backlight unit 12 is formed with a number of the divided light exit portions 31S. As described above, the divided light guide portions 32s and the divided light exit portions 31S of the light guide plates 18 are optically independent from each other. Turning on and off of the LEDs 16 are controlled independently. The outgoing light (amounts of light, emission or non-emission of light) from the divided light exit portion 31S can be controlled independently. The driving of the backlight unit 12 can be controlled using an area active technology that provides control of outgoing light for each area. This significantly improves contrast that is very important for display performance of the liquid crystal display device 10.

As illustrated in FIG. 12, the LED 16 is arranged in the LED holding space 33 with entire peripheries thereof are separated from the inner walls of the LED holding space 33 (including the light entrance surface 34) by gaps in predetermined sizes. The gap between the light emitting surface 16a and the light entrance surface 34 is approximately 0.3 mm, for example. It is preferable that the light emitting surface 16a of the LED 16 and the light entrance surface 34 are provided in closely contact with each other so as not to occur light leak. However, the gaps are provided in this embodiment because of the following reasons. The gaps are provided for compensating for an error related to a mounting position of the light guide plate 18 with respect to the LED board 17. The gaps are required for allowing thermal expansion of the light guide plate 18, which may occur due to heat generated during lighting of the LED 16. By providing the gaps between the LED 16 and the walls of the LED holding space 33, the light guide plate 18 is less likely to touch the LED 16 and thus the LED 16 is protected from being damaged. As described later, in this embodiment, the light entrance surface 34 is formed to be an inclined surface using spaces of the gaps between the light emitting surface 16a and the light entrance surface 34.

<Detailed Configuration of LED Holding Space>

Figure 14:
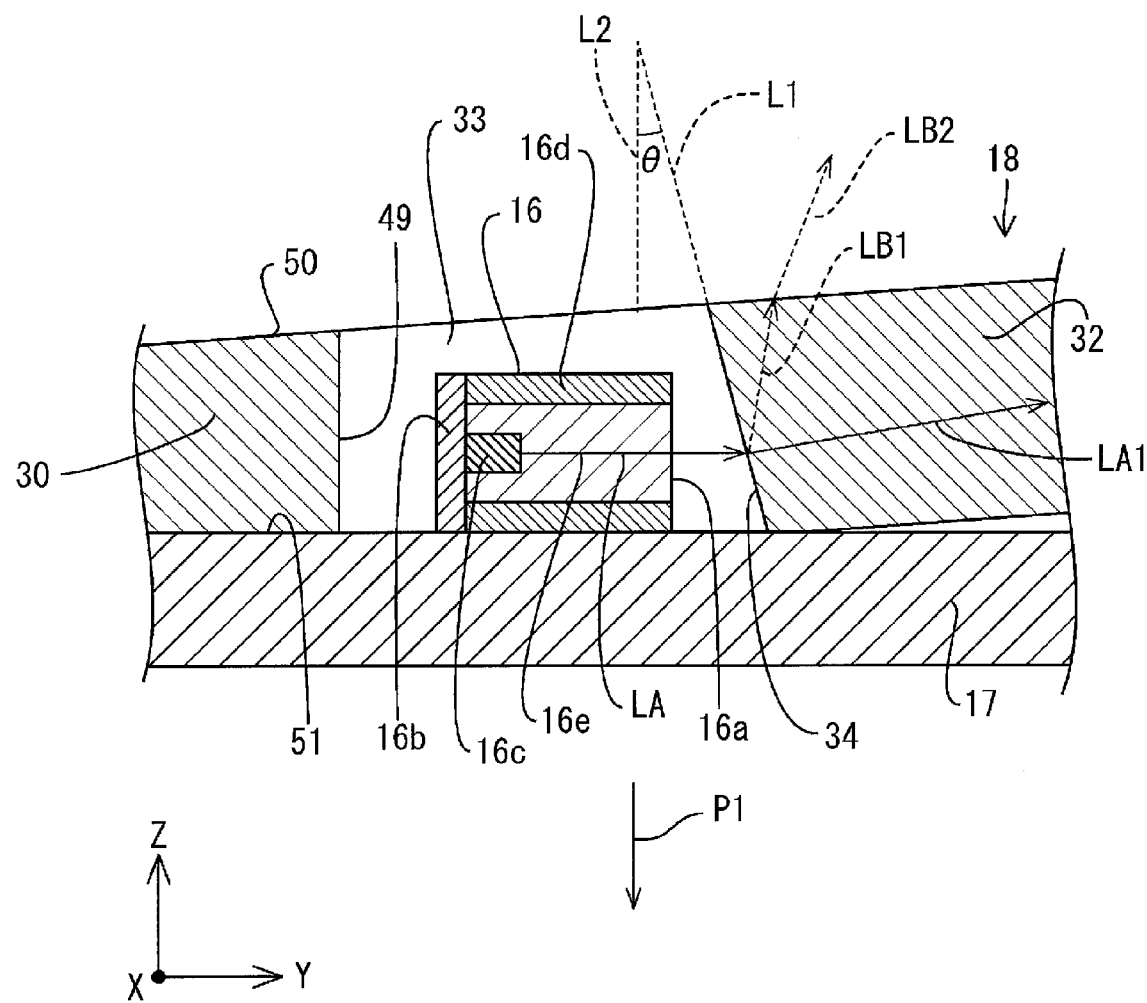
FIG. 14 is a magnified cross-sectional view of an LED holding space of a first embodiment.
Figure 15:
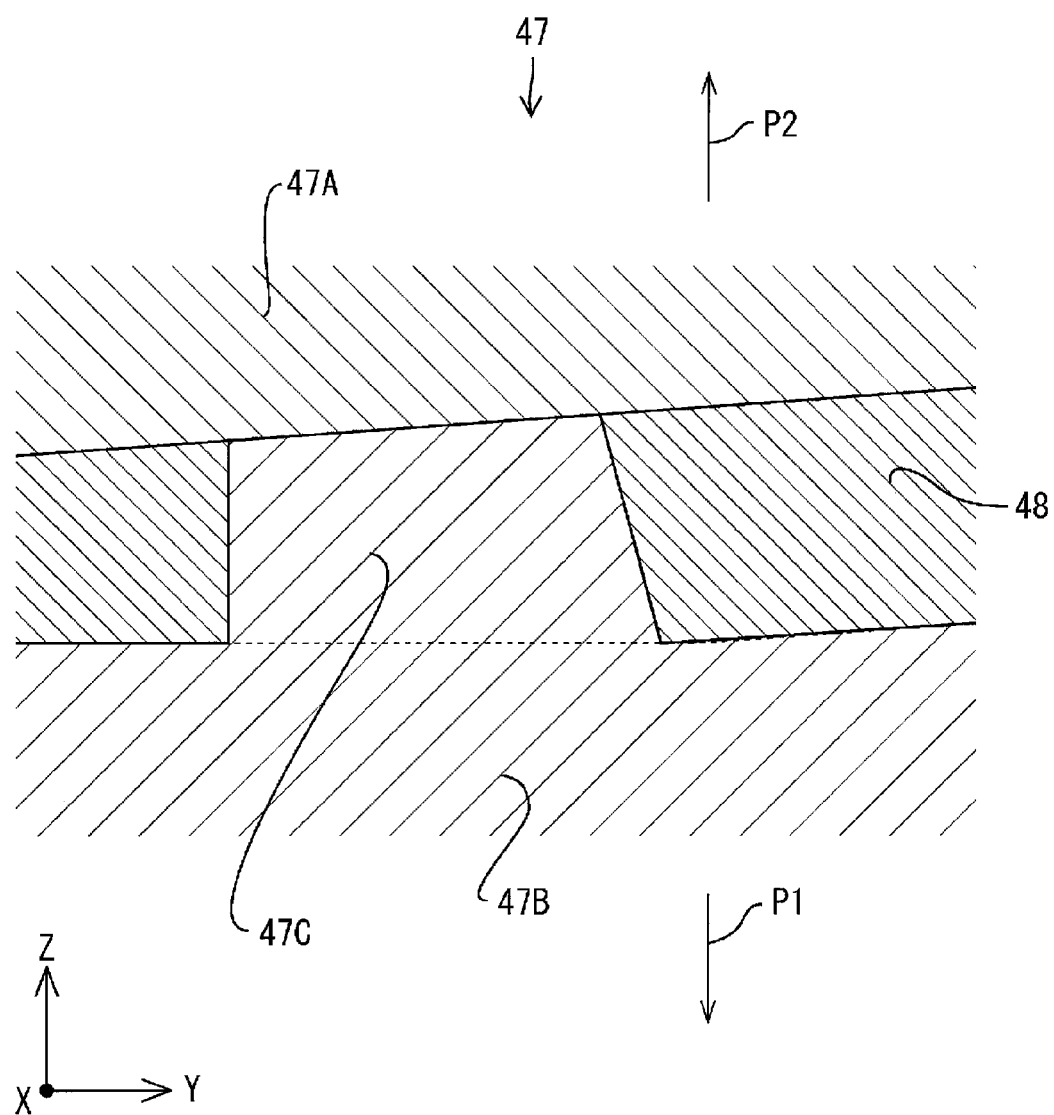
FIG. 15 is a cross-sectional view of a molding die that is closed in the first embodiment.
Figure 16:
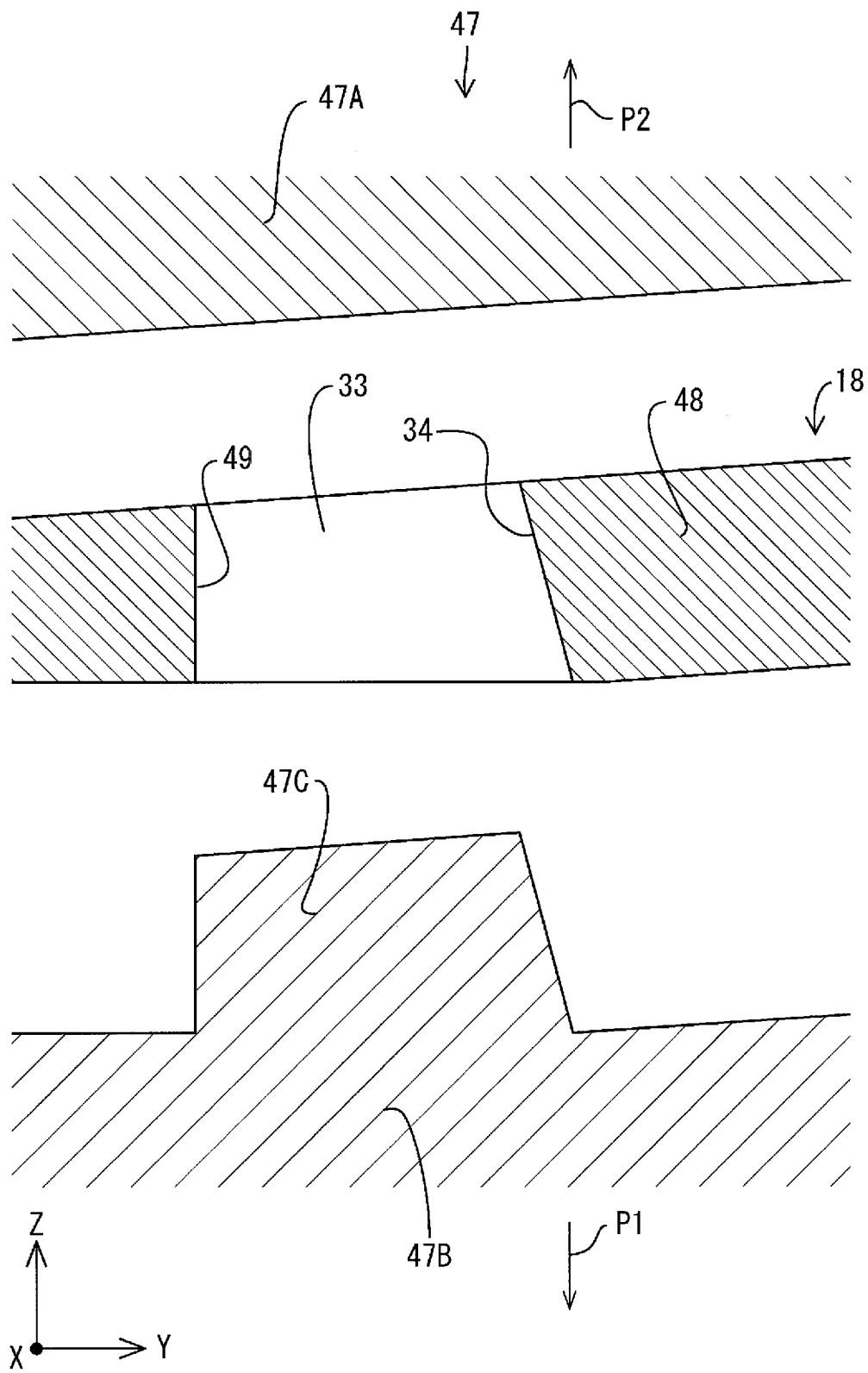
FIG. 16 is a cross-sectional view of the molding die that is opened in the first embodiment.

Next, a detailed configuration of the LED holding space 33 will be explained with reference to FIGS. 14 to 16. The light guide plate 18 of this embodiment is formed by injection molding with a molding die 47, because the scattering surface 37 is required to be formed thereon. FIGS. 15 and 16 are cross-sectional views illustrating that the light guide plate 18 is formed by injection molding with the molding die 47. FIG. 14 is a magnified cross-sectional view of the LED holding space 33 and the inclination angle of the light entrance surface 34 is described greater than the actual one in FIG. 14. In the present embodiment, the light entrance surface 34 is inclined with respect to a removing direction in which the molding die 47 for molding the light guide plate 18 is removed. The inclination angle described in FIG. 14 is greater than the actual inclination angle θ (approximately 10 degrees) so as to recognize that the light entrance surface 34 is inclined.

The molding die 47 for molding the light guide plate 18 includes an upper mold 47A and a lower mold 47B, as illustrated in FIGS. 15 and 16. The lower mold 47B includes a projection 47C for forming the LED holding space 33 by molding. When the upper mold 47A and the lower mold 47B are closed, a molding space is formed therebetween. Melted resin 48 is supplied into the molding space and the molding space is filled with the melted resin 48 as illustrated in FIG. 15. After the resin 48 is cooled down, the upper mold 47A and the lower mold 47B are separated from each other as illustrated in FIG. 16. Then, the cooled and solidified resin 48 is separated from the molding die to obtain the light guide plate 18.

A surface in the LED holding space 33 facing the light entrance surface 34 is a vertical surface along the removing direction in which the lower mold 47B is removed. While the resin 48 is cooled down, the resin 48 is shrunk. Therefore, the projection 47C is held between the light entrance surface 34 and the vertical surface 49. If the light entrance surface 34 is parallel to the vertical surface 49, or if the light entrance surface 34 is parallel to a surface along the removing direction in which the lower mold 47B is removed, the light entrance surface 34 and the projection 47C move relatively with being in closely contact with each other and the light entrance surface 34 rubs against the projection 47C. This may damage the light entrance surface 34.

In this embodiment, the LED holding space 33 is formed such that the opening size of the LED holding space 33 in the light guide plate 18 becomes greater in the removing direction in which the lower mold 47B is removed. That is, the opening size is greater as it is closer to the lower mold 47B side. The light entrance surface 34 is an inclined surface that is inclined with respect to a reference plane L2 so as to face toward a surface 51 of the LED board 17. The reference plane L2 is parallel to the removing direction in which the lower mold 47B is removed (the mold removing direction). Accordingly, when the light entrance surface 34 and the projection 47C move relatively in the mold removing direction, they are separated from each other and rubbing of the projection 47C and the light entrance surface 34 does not occur. Therefore, the light entrance surface 34 is not damaged.

The removing direction in which the lower mold 47B is removed is a direction described by an arrow P1 in FIGS. 14 to 16. The removing direction P1 extends from a surface 50 of the light guide plate 18 opposite from the LED board 17 toward the surface 51 of the LED board 17. The removing direction P1 in which the lower mold 47B is removed is an opposite from a removing direction P2 in which the upper mold 47A is removed. The reference plane L2 is a surface along the removing direction P1 in which the lower mold 47B is removed and parallel to an X-Z plane surface. The inclination angle θ is formed by the crossing surfaces of a inclined surface L1 extending from the light entrance surface 34 and the reference plane L2. The inclination angle θ is measured in view of the X-axis direction. The inclination angle θ is preferably from 1 to 10 degrees and more preferably from 1 to 3 degrees.

The light entrance surface 34 is provided to face the light emitting surface 16a of the LED 16. The light axis LA1 of rays of light entering the light entrance surface 34 and traveling through the light guide portion 32 is infracted upwardly in the Z-axis direction from the light axis LA. Because the inclination angle θ is quite small that is approximately from 1 to 3 degrees, the rays of light do not leak outside of the light guide portion 32. If the light entrance surface 34 is damaged, the infraction direction is greatly changed at the light entrance surface 34. Accordingly, light axis LB1 of rays of light traveling through the light guide portion 32 breaks the total reflection at the interface between the inside and the outside of the light guide portion 32 and exits outside. This causes leak light (light axis LB2 of leak light). In this embodiment, the light entrance surface 34 is an inclined surface and the releasing property between the projection 47C and the light entrance surface 34 is extremely improved. The light entrance surface 34 is less likely to be damaged. Therefore, significant change of the infraction direction at the light entrance surface is less likely to occur and leak light (the light axis LB2 of the leak light) is less likely to be caused. Accordingly, the amount of rays of light reaching the light exit surface 36 is increased and improved brightness on the liquid panel 11 is achieved.

The present embodiment as described above has following effects.

The LED holding space 33 is formed to be open on the surface 51 side of the LED board 17. Therefore, the light guide plate 18 is fixed to the LED board 17 with the LED 16 that is fixed to the surface 51 of the LED board 17 being held in the LED holding space 33.

The LED 16 is bare to the outside of the LED holding space 33 when the LED 16 is held in the LED holding space 33. This easily releases heat generated at the LEDs 16.

The scattering surface 37 is formed by a number of the perforations 37a. The perorations 37a have functions of prisms to reflect rays of light.

The farther from the light entrance surface 34, the smaller the arrangement pitch of the perforations 37a becomes. Therefore, uneven brightness does not occur.

Because the light emitting surface 16a is provided to face toward the light entrance surface 34, the rays of light emitted from the light emitting surface 16a effectively enter the light entrance surface.

The light emitting diodes 16 are used as the light emitting components. This achieves improved brightness.

The LED board 17 is used as the base member. Therefore, the LEDs 16 are fixed to the LED board 17 and the power is supplied to the LEDs 16 from the LED board 17.

The rays of light emitting from the LEDs 16 reflect off the surface 51 of the LED board 17 to enter the light entrance surface 34. Leak light is less likely to be caused and improved brightness is achieved.

The light axis LA of the rays of light emitting from the LED 16 is substantially perpendicular to the light axis of rays of light exiting from the light exit surface 36. This makes the light guide plate 18 to be thinner in the Z-axis direction.

The optical member 15 includes the diffusers 15a, 15b. Therefore, rays of light entering the diffusers 15a, 15b are diffused by the diffuser particles. Accordingly, uneven brightness is less likely to occur.

The light guide plate 18 includes the board mounting portion 30, the light guide portion 32 and the light exit portion 31 in this order from the LED 16 side along the Y-axis direction. This makes the light guide plate 18 to be thinner in the Z-axis direction.

The light entrance surface 34 is provided at the interface between the board mounting portion 30 and the light guide portion 32. Therefore, rays of light directly enter and travel through the light guide portion 32.

A number of light guide plates 18 are two-dimensionally arranged in a direction parallel to a plane surface of the light exit surface. The uneven brightness is less likely to occur in the backlight unit 12.

Second Embodiment

Figure 17:
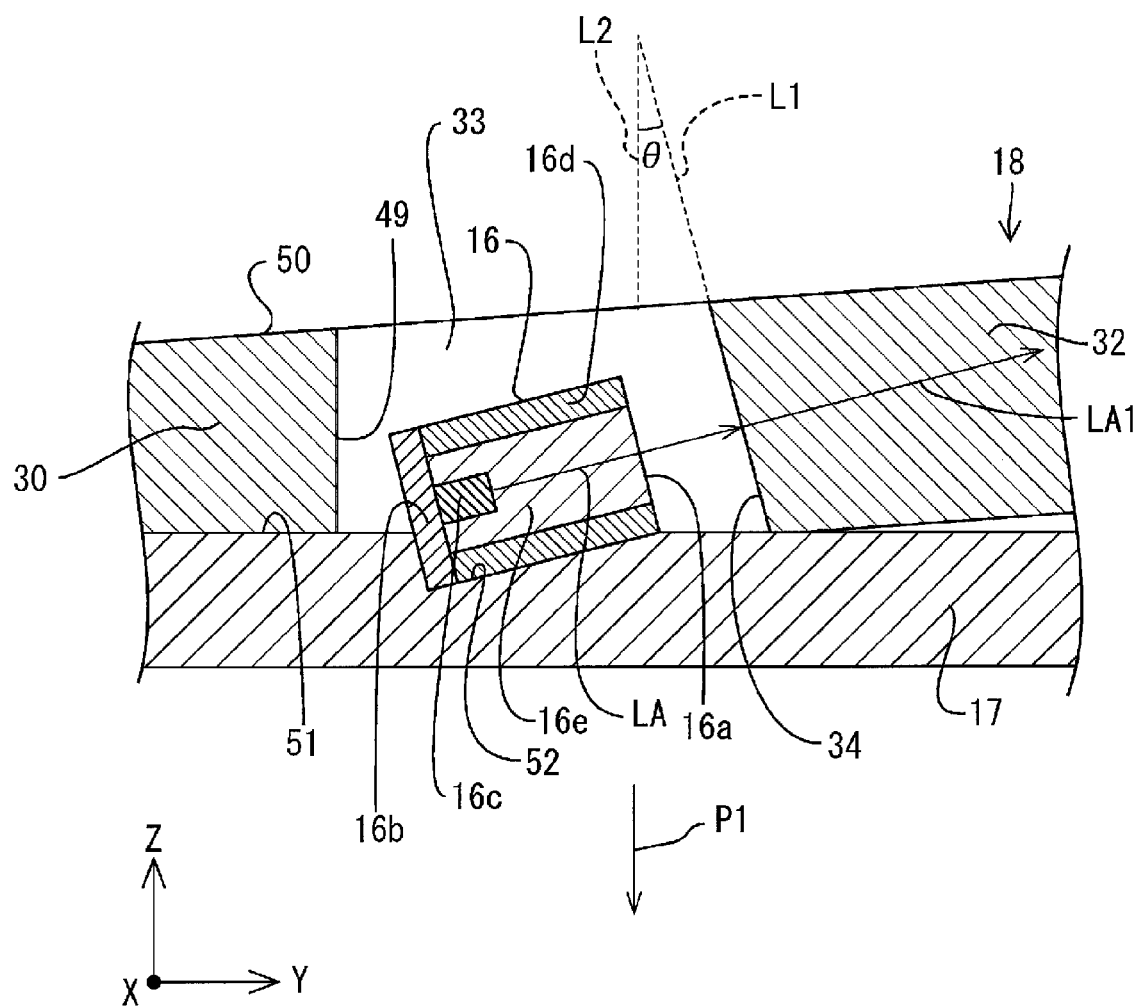
FIG. 17 is a cross sectional view of and LED holding space of a second embodiment.

Next, the second embodiment of the present invention will be explained with reference to FIG. 17. In this embodiment, the LED 16 of the first embodiment is arranged with being inclined. The same components as the first embodiment will be indicated with the same symbols. The same configuration, functions and effects will not be explained.

In this embodiment, the light emitting surface 16a of the LED 16 is provided to be parallel to the light entrance surface 34. Therefore, the light axis LA of rays of light emitting from the light emitting surface 16a is perpendicular to the light entrance surface 34. Accordingly, the light axis LA of rays of light from the LED 16 is provided on the same line as the light axis LA1 of rays of light traveling through the light guide portion 32. This makes the rays of light from the LED 16 to enter the light entrance surface 34 effectively. In this embodiment, a recess 52 is formed on the surface 51 of the LED board 17 and the LED 16 is fixed in the recess 52. However, a projection may be formed on the surface 51 of the LED board 17 and the LED 16 may be provided on the projection with being inclined.

Other Embodiments

The present invention is not limited to the above embodiments explained in the above description. The following embodiments may be included in the technical scope of the present invention, for example.

(1) In the above embodiments, a pair of LEDs 16 is provided for each light guide plate 18. However, three or more LEDs may be provided for each guide plate 18.

(2) In the above embodiments, each light guide plate 18 has a single slit 42. However, each light guide plate 18 may have two or more slits 42. With such a configuration, a single light guide plate 18 can collectively cover three or more LEDs. This makes assembly of the backlight unit easier.

(3) In the above embodiments, each light guide plate 18 has the slit 42 that divides the light exit portion 31 and the light guide portion 32 so that a single light guide plate 18 has a plurality of areas that are optically independent from each other. However, each light guide plate 18 may not have the slit 42 and each light guide plate 18 may include a single LED 16 (i.e., a single light entrance surface 34). With this configuration, light from the adjacent LED 16 that is not an object to be covered by a specific light guide plate 18 is less likely to enter the specific light guide plate 18. As a result, each light guide plate 18 can maintain optical independence from another.

(4) In the above embodiments, the light guide plates 18 are fixed to the respective LED boards 17. However, the light guide plates 18 may be fixed to the LED boards 17 that are collectively fixed to the bottom plate 14a of the chassis 14. In this case, the bottom plate 14a of the chassis 14 is a "base member," and the light guide plates 18 are directly fixed to the bottom plate 14a of the chassis 14, which is a "base member." The LEDs 16 are indirectly fixed to the bottom plate 14a of the chassis 14 via the LED boards 17.

(5) In the above embodiments, the light guide plate 18 is fixed to the LED board 17 by the clips 23. However, the light guide plate 18 may be fixed to the LED board 17 by other components such as adhesives or double-sided tapes. In this case, the light guide plates 18 do not require holes or projections such as the clip insertion holes 43 and the clip holding holes 44. Therefore, the light guide plates 18 do not receive optical adverse effects. Furthermore, the fixing points of the light guide plates 18 with fixing members can be set at locations immediately before the light entrance surfaces 34. Namely, this configuration provides higher flexibility in design.

(6) In the above embodiments, each light guide plate 18 has a rectangular shape in a plan view. However, each light guide plate 18 may have a square shape in a plan view. The lengths, the widths, the thicknesses and the outer surface shapes of each board mounting portion 30, each light guide portion 32 and each light exit portion 31 can be altered as necessary.

(7) In the above embodiments, each LED 16 emits light upward in the vertical direction. However, the light emitting direction of each LED 16 can be altered as necessary. Namely, each LED 16 can be mounted to the LED board 17 in a suitable position. Specifically, each LED 16 can be mounted to the LED board 17 so as to emit light downward in the vertical direction, or such that the light emitting direction (the light axis) aligned with the horizontal direction. The LEDs 16 with different light emitting directions may be included.

(8) In the above embodiments, each LED 16 includes three different LED chips 16c configured to emit respective colors of RGB. However, LEDs each including a single LED chip configured to emit a single color of blue or violet and each configured to emit white light using fluorescent material may be used.

(9) In the above embodiments, each LED 16 includes three different LED chips 16c configured to emit respective colors of RGB. However, LEDs each including three different LED chips configured to emit respective colors of cyan (C), magenta (M) and yellow (Y) or white LEDs may be used.

(10) In the above embodiments, the liquid crystal panel 11 and the chassis 14 are held in the vertical position with the short-side direction thereof aligned with the vertical direction. However, the liquid crystal panel 11 and the chassis 14 may be held in the vertical position with the long-side direction thereof aligned with the vertical direction.

(11) In the above embodiments, the light entrance surface 34 is the inclined surface. However, the light entrance surface 34 may be a vertical surface and the lower mold 47B may be removed in a diagonal direction with respect to the vertical direction.

(12) In the above embodiments, the projection 47C is formed integrally with the lower mold 47B. However, the projection 47C may be formed integrally with the upper mold 47A and the upper mold 47B including the projection 47C may be removed in the direction P2 in which the upper mold is removed. In such a case, the light entrance surface 34 faces in a direction opposite from the surface 51 of the LED board 17.

(13) In the above embodiments, the LED holding space 33 is formed in a through hole. However, the LED holding space 33 may be formed in a recess.

(14) In the above embodiments, the scattering surface 37 includes a number of perforations 37a that are arranged to be parallel to each other. However, a number of recesses are provided along lines vertically and horizontally to form the scattering surface.

(15) In the above embodiments, the farther from the light entrance surface 34 the shorter the arrangement pitch of the perforations 37a becomes. However, the perforations 37a may be arranged at equal intervals such that the farther from the light entrance surface 34 the smaller the width of each perforation 37a becomes.

(16) In the above embodiments, the LEDs 16 are used as point light sources. However, point light sources other than LEDs 16 can be used.

(17) In the above embodiments, the point light sources are used as the light sources. However, linear light sources such as cold cathode tubes and hot cathode tubes may be used.

(18) Planar light sources such as organic ELs may be used other than the above embodiments and the embodiments (16) and (17).

(19) In the above embodiments, the light axis of rays of light outgoing from the light exit surface 36 toward the optical member 15 is substantially perpendicular to the light axis LA of rays of light emitting from the LED 16. However, the LED 16 may be provided on a side of the light guide plate 18 that is opposite from the light exit surface 36 side.

(20) The optical member 15 may be configured differently from the above embodiments. Specifically, the number of diffusers 15a and 15b or the number and the kind of the optical sheets 15c can be altered as necessary. Furthermore, a plurality of optical sheets 15c in the same kind may be used.

(21) In the above embodiments, the LEDs 16 and the light guide plates 18 are two-dimensionally arranged parallel to each other inside the chassis 14. However, they may be one-dimensionally arranged parallel to each other. Specifically, the LEDs 16 and the light guide plates 18 are arranged parallel to each other only in the vertical direction, or they are arranged parallel to each other only in the horizontal direction.

(22) In the above embodiments, the light guide plates 18 are arranged so as to overlap each other in a plan view. However, the light guide plates 18 may be arranged so as not to overlap each other in a plan view.

(23) In the above embodiments, the liquid crystal display device 10 including the liquid crystal panel 11 as a display component is used. The technology can be applied to display devices including other types of display components.

(24) In the above embodiments, the television receiver TV including the tuner T is used. However, the technology can be applied to a display device without a tuner T.

The invention claimed is:

1. A lighting device comprising:
   a light emitting component;
   a light guide member; and
   a base member on which the light emitting component and the light guide member are provided,
   the light guide member including:
   a holding portion having a holding space in the light guide member such that an opening size of the holding portion increases in a direction in which a molding die for forming the holding space is removed when forming the holding space and configured to hold the light emitting component in the holding space;
   a light entrance surface provided in the holding space;
   a scattering surface formed by performing perforation processing;
   a light exit surface through which light exits to outside of the light guide member after traveling through the light guide member and reflecting off the scattering surface; and
   the light entrance surface is an inclined surface being inclined with respect to a surface extending in the direction in which the molding die is removed that is a reference plane so as to face toward a surface of the base member.

2. The lighting device according to claim 1, wherein the direction in which the molding die is removed is from a surface of the light guide member opposite from the base member toward a front surface of the base member.

3. A lighting device comprising:
   a light emitting component;
   a light guide member; and
   a base member on which the light emitting component and the light guide member are provided,
   the light guide member including:
   a holding portion having a holding space in the light guide member such that an opening size of the holding portion increases in a direction in which a molding die for forming the holding space is removed when forming the holding space and configured to hold the light emitting component in the holding space;
   a light entrance surface provided in the holding space;
   a scattering surface formed by performing perforation processing;
   a light exit surface through which light exits to outside of the light guide member after traveling through the light guide member and reflecting off the scattering surface; and
   the holding portion has a through hole passing through a mounting portion of the light guide member that is to be mounted to the base member and the holding space is provided in the through hole.

4. The lighting device according to claim 1, wherein the scattering surface is formed by providing a number of straight elongated perforations at a predetermined interval.

5. The lighting device according to claim 4, wherein the interval becomes smaller as each perforation is farther from the light entrance surface.

6. The lighting device according to claim 1, wherein the light emitting component has a light emitting surface and the light emitting surface is provided to be parallel to and face the light entrance surface.

7. The lighting device according to claim 1, wherein the light emitting component is a light emitting diode.

8. A lighting device comprising:
a light emitting component;
a light guide member; and
a base member on which the light emitting component and the light guide member are provided,
the light guide member including:
a holding portion having a holding space in the light guide member such that an opening size of the holding portion increases in a direction in which a molding die for forming the holding space is removed when forming the holding space and configured to hold the light emitting component in the holding space;
a light entrance surface provided in the holding space;
a scattering surface formed by performing perforation processing;
a light exit surface through which light exits to outside of the light guide member after traveling through the light guide member and reflecting off the scattering surface; and
the base member is a circuit board on which the light emitting component is mounted.

9. The lighting device according to claim 1, wherein the base member is made of synthetic resin and a surface thereof is in white that provides high light reflectivity.

10. The lighting device according to claim 1, further comprising an optical member provided to face the light exit surface, wherein:
light axis of light exiting from the light exit surface toward the optical member is substantially vertical to the optical member; and
light axis of light emitting from the light emitting component is substantially parallel to the optical member.

11. The lighting device according to claim 10, wherein the optical member includes a diffuser plate including a transparent resin base material with a predefined thickness and a large number of diffusing particles scattered in the base material.

12. The lighting device according to claim 3, wherein the light guide member collectively includes the mounting portion, a light exit portion and a light guide portion, and the light exit portion has the light exit surface and the light guide portion is provided between the mounting portion and the light exit portion, and the mounting portion, the light guide portion and the light exit portion are arranged in this order from the light emitting component side.

13. The lighting device according to claim 12, wherein an entire area of an outer surface of the light guide portion is substantially a flat and smooth surface, and the light entrance surface is provided at an interface of the mounting portion and the light guide portion.

14. The lighting device according to claim 1, wherein the light guide member includes a number of light guide members and the light guide members are two-dimensionally arranged along a planar direction of the light exit surface.

15. A display device comprising:
the lighting device according to claim 1; and
a display panel configured to provide display using light from the lighting device.

16. The display device according to claim 15, wherein the display panel is a liquid crystal panel including liquid crystals sealed between a pair of substrates.

17. A television receiver comprising the display device according to claim 15.

* * * * *